United States Patent
Tamse et al.

(10) Patent No.: US 12,149,700 B2
(45) Date of Patent: Nov. 19, 2024

(54) VIDEO DECODING METHOD AND APPARATUS, AND VIDEO ENCODING METHOD AND APPARATUS INVOLVING SUB-BLOCK MERGE INDEX CONTEXT AND BYPASS MODEL

(71) Applicant: SAMSUNG ELECTRONICS CO., LTD., Suwon-si (KR)

(72) Inventors: Anish Tamse, Suwon-si (KR); Minwoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 18/148,937

(22) Filed: Dec. 30, 2022

(65) Prior Publication Data

US 2023/0146358 A1 May 11, 2023

Related U.S. Application Data

(63) Continuation of application No. 17/282,946, filed as application No. PCT/KR2019/013182 on Oct. 8, 2019, now Pat. No. 11,558,622.

(Continued)

(51) Int. Cl.
  *H04N 19/137* (2014.01)
  *H04N 19/105* (2014.01)
  (Continued)

(52) U.S. Cl.
  CPC ......... *H04N 19/137* (2014.11); *H04N 19/105* (2014.11); *H04N 19/13* (2014.11);
  (Continued)

(58) Field of Classification Search
  CPC .... H04N 19/137; H04N 19/105; H04N 19/13; H04N 19/159; H04N 19/176;
  (Continued)

(56) References Cited

U.S. PATENT DOCUMENTS

| | | | |
|---|---|---|---|
| 8,995,523 B2 | 3/2015 | Chien et al. | |
| 9,282,338 B2 | 3/2016 | Zheng et al. | |

(Continued)

FOREIGN PATENT DOCUMENTS

| | | |
|---|---|---|
| CN | 103609121 A | 2/2014 |
| CN | 103907346 A | 7/2014 |

(Continued)

OTHER PUBLICATIONS

Indian Office Action, dated Dec. 14, 2022, issued by the Intellectual Property India, Application No. 202127016764.

(Continued)

*Primary Examiner* — Francis Geroleo
(74) *Attorney, Agent, or Firm* — Sughrue Mion, PLLC

(57) ABSTRACT

Provided are a video decoding method and apparatus, in which, during video encoding and decoding processes: in which a first bin of a sub-block merge index indicating a candidate motion vector of a sub-block merge mode is obtained, the first bin being arithmetic-encoded using a context model, a second arithmetic-encoded in a bypass mode is obtained based on a first value obtained by arithmetic-decoding the first bin by using the context model, a second value is obtained by arithmetic-decoding the second bin in the bypass mode, and prediction on a current block is performed in the sub-block merge mode, based on the first value and the second value.

3 Claims, 23 Drawing Sheets

Related U.S. Application Data

(60) Provisional application No. 62/743,017, filed on Oct. 9, 2018.

(51) Int. Cl.
  *H04N 19/13* (2014.01)
  *H04N 19/159* (2014.01)
  *H04N 19/176* (2014.01)
  *H04N 19/46* (2014.01)

(52) U.S. Cl.
  CPC ......... *H04N 19/159* (2014.11); *H04N 19/176* (2014.11); *H04N 19/46* (2014.11)

(58) Field of Classification Search
  CPC ........ H04N 19/46; H04N 19/52; H04N 19/91; H04N 19/139; H04N 19/70
  See application file for complete search history.

(56) References Cited

U.S. PATENT DOCUMENTS

| | | | |
|---|---|---|---|
| 9,516,343 | B2 | 12/2016 | Misra et al. |
| 2013/0114673 | A1* | 5/2013 | Chien .................... H04N 19/60 375/E7.126 |
| 2014/0241434 | A1 | 8/2014 | Lin et al. |
| 2014/0328396 | A1* | 11/2014 | Guo .................... H04N 19/124 375/240.03 |
| 2015/0098513 | A1 | 4/2015 | Fu et al. |
| 2018/0070100 | A1 | 3/2018 | Chen et al. |
| 2018/0288430 | A1* | 10/2018 | Chen .................. G06F 16/7837 |
| 2018/0338144 | A1* | 11/2018 | Nam .................... H04N 19/149 |
| 2020/0329247 | A1 | 10/2020 | Sullivan et al. |
| 2021/0105483 | A1 | 4/2021 | Lee |
| 2021/0152843 | A1 | 5/2021 | Lee et al. |
| 2023/0043548 | A1 | 2/2023 | Jeong et al. |

FOREIGN PATENT DOCUMENTS

| | | |
|---|---|---|
| CN | 103959782 A | 7/2014 |
| CN | 107113440 A | 8/2017 |
| EP | 3 857 896 | 5/2020 |
| JP | 2014-522603 A | 9/2014 |
| KR | 10-2014-0018873 A | 2/2014 |
| KR | 10-2016-0106703 A | 9/2016 |
| KR | 10-2018-0073464 A | 7/2018 |
| WO | 2018/182310 A1 | 10/2018 |
| WO | 2019/066574 A1 | 4/2019 |
| WO | 2020/022853 A1 | 1/2020 |
| WO | 2020/060236 A1 | 3/2020 |
| WO | 2020/256310 A1 | 12/2020 |

OTHER PUBLICATIONS

European Search Report, dated Jan. 12, 2023, issued by the European Patent Office, Application No. 19871369.5.
Yang et al., "Description of CE4: Inter prediction and motion vector coding," Joint Video Experts Team (JVET) of ITU-T SG 16 WP 3 and ISO/IEC JTC 1/SC 29/WG 11, Document: JVET-J1024, Apr. 20, 2018, XP030151318, Total 44 pages.
International Search Report (PCT/ISA/210) issued by the International Searching Authority in International Application No. PCT/KR2019/013182, issued on Jan. 20, 2020.
Communication dated Oct. 10, 2022, issued by the European Patent Office in counterpart European Application No. 19871369.5.
Communication dated Aug. 1, 2022, issued by the European Patent Office in counterpart European Application No. 19871369.5.
International Preliminary Report on Patentability with a Translation of Written Opinion in International Application No. PCT/KR2019/013182, issued on Mar. 12, 2021.
Laroche et al., "CE4-related: On Merge Index coding," Joint Video Experts Team (JVET) of ITU-T SG 16 WP 3 and ISO/IEC JTC 1/SC 29/WG 11, Document: JVET-L0194, Sep. 24, 2018, XP030193705, Total 3 pages.
Communication dated Sep. 29, 2023, issued by the European Patent Office in counterpart European Application No. 23183551.3.
Communication dated Dec. 11, 2023, issued by the State Intellectual Property Office of People's Republic of China in counterpart Chinese Application No. 201980081284.2.
Guillaume Laroche, et al., "CE4-related: On Merge Index coding", JVET of ITU-T SG 16 WP 3 and ISO/IEC JTC 1/SC 29/WG 11, Document: JVET-Lxxxx, Sep. 24, 2018, Total 3 pages.
Hyeongmun Jang et al., "Motion vector representing bit reduction", 12. JVET Meeting; Oct. 3-12, 2018, No. JVET-L0168, Sep. 24, 2018, XP 030193693, Total 3 pages.
Jianle Chen et al., "Algorithm description for Versatile Video Coding and Test Model 2 (VTM 2)", 11. JVET Meeting, Jul. 10-18, 2018, Document: JVET-K1002-v1, Sep. 30, 2018, XP 030194056, Total 21 pages.
Gary Sullivan et al., "Meeting Report of the 11th meeting of the Joint Video Experts Team (JVET), Ljubljana, SI, Jul. 10-18, 2018", 11. JVET Meeting, Jul. 10-18, 2018, Document: JVET-K1000-v1, Oct. 2, 2018, XP 030194251, Total 290 pages.

* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

AFFINE CODING UNIT

VIDEO DECODING METHOD AND APPARATUS, AND VIDEO ENCODING METHOD AND APPARATUS INVOLVING SUB-BLOCK MERGE INDEX CONTEXT AND BYPASS MODEL

CROSS REFERENCE TO RELATED APPLICATIONS

This is a Continuation Application of U.S. application Ser. No. 17/282,946 filed Apr. 5, 2021, which is a National Stage of International Application No. PCT/KR2019/013182 filed Oct. 8, 2019, which claims benefit of U.S. Provisional No. 62/743,017 filed Oct. 9, 2018 in the United States Patent and Trademark Office. The disclosures of which are incorporated herein by reference in their entireties.

TECHNICAL FIELD

The disclosure relates to a video decoding method and a video decoding apparatus, and more particularly, to an image encoding method and apparatus and an image decoding method and apparatus, in which a first bin of a sub-block merge index indicating a candidate motion vector of a sub-block merge mode is obtained, the first bin being arithmetic-encoded using a context model, a second bin arithmetic-encoded in a bypass mode is obtained based on a first value obtained by arithmetic-decoding the first bin by using the context model, a second value is obtained by arithmetic-decoding the second bin in the bypass mode, and prediction on a current block is performed in the sub-block merge mode, based on the first value and the second value.

Also, the disclosure relates to an image encoding method and apparatus and an image decoding method and apparatus, in which whether a motion vector precision of a current block is a ¼ pixel or a 1/16 pixel is determined, when the motion vector precision is a ¼ pixel, a range of a motion vector is determined to be 16 bits, when the motion vector precision is a 1/16 pixel, the range of the motion vector is determined to be 18 bits, and inter prediction is performed on the current block, based on the determined range of the motion vector.

BACKGROUND ART

Image data is encoded by a codec according to a predetermined data compression standard, for example, a moving picture expert group (MPEG) standard, and then is stored in the form of a bitstream in a recording medium or is transmitted via a communication channel.

With the development and supply of hardware capable of reproducing and storing high-resolution or high-definition image content, there is an increasing demand for a codec for effectively encoding or decoding the high-resolution or high-definition image content. Encoded image content may be reproduced by being decoded. Recently, methods for effectively compressing such high-resolution or high-definition image content are performed. For example, the methods are proposed to effectively implement an image compression technology through a process of splitting an image to be encoded by a random method or rendering data.

As one of techniques for rendering data, it is general that context-adaptive binary arithmetic coding (CABAC) encoding and CABAC decoding are performed in entropy coding. Also, in inter prediction, it is general that a range of a motion vector is constant, which is 16 bits.

DESCRIPTION OF EMBODIMENTS

Technical Problem

In a video encoding and decoding process, provided are a method and apparatus for obtaining a first bin of a sub-block merge index indicating a candidate motion vector of a sub-block merge mode, the first bin being arithmetic-encoded using a context model, obtaining a second bin arithmetic-encoded in a bypass mode, based on a first value obtained by arithmetic-decoding the first bin by using the context model, obtaining a second value by arithmetic-decoding the second bin in the bypass mode, and performing prediction on a current block in the sub-block merge mode, based on the first value and the second value.

Also, in the video encoding and decoding process, provided are a method and apparatus for determining whether a motion vector precision of a current block is a ¼ pixel or a 1/16 pixel, determining a range of a motion vector to be 16 bits when the motion vector precision is a ¼ pixel, determining the range of the motion vector to be 18 bits when the motion vector precision is a 1/16 pixel, and performing inter prediction on the current block, based on the determined range of the motion vector.

Solution to Problem

To solve the technical problem, the disclosure provides a video decoding method including: obtaining a first bin of a sub-block merge index indicating a candidate motion vector of a sub-block merge mode, the first bin being arithmetic-encoded using a context model; obtaining a second bin arithmetic-encoded in a bypass mode, based on a first value obtained by arithmetic-decoding the first bin by using the context model; obtaining a second value by arithmetic-decoding the second bin in the bypass mode; and performing prediction on a current block in the sub-block merge mode, based on the first value and the second value.

To solve the technical problem, the disclosure provides a video decoding apparatus including: a memory; and at least one processor connected to the memory, wherein the at least one processor is configured to obtain a first bin of a sub-block merge index indicating a candidate motion vector of a sub-block merge mode, the first bin being arithmetic-encoded using a context model, obtain a second bin arithmetic-encoded in a bypass mode, based on a first value obtained by arithmetic-decoding the first bin by using the context model, obtain a second value by arithmetic-decoding the second bin in the bypass mode, and perform prediction on a current block in the sub-block merge mode, based on the first value and the second value.

To solve the technical problem, the disclosure provides a video encoding method including: generating a symbol indicating a sub-block merge index indicating a candidate motion vector of a sub-block merge mode, by performing prediction on a current block in the sub-block merge mode; performing arithmetic-encoding on a first bin of the symbol by using a context model; performing bypass mode arithmetic-encoding on a second bin of the symbol, based on the first bin of the symbol; and generating a bitstream based on a result of the arithmetic-encoding using the context model and a result of the bypass mode arithmetic-encoding.

To solve the technical problem, the disclosure provides a video encoding apparatus including: a memory; and at least one processor connected to the memory, wherein the at least one processor is configured to generate a symbol indicating a sub-block merge index indicating a candidate motion vector of a sub-block merge mode, by performing prediction on a current block in the sub-block merge mode, perform arithmetic-encoding on a first bin of the symbol by using a context model, perform bypass mode arithmetic-encoding on a second bin of the symbol, based on the first bin of the symbol, and generate a bitstream based on a result of the arithmetic-encoding using the context model and a result of the bypass mode arithmetic-encoding.

To solve the technical problem, the disclosure provides a video decoding method including: determining whether a motion vector precision of a current block is a ¼ pixel or a ¹⁄₁₆ pixel; determining a range of the motion vector to be 16 bits when the motion vector precision is a ¼ pixel; determining the range of the motion vector to be 18 bits when the motion vector precision is a ¹⁄₁₆ pixel; and performing inter prediction on the current block, based on the determined range of the motion vector.

To solve the technical problem, the disclosure provides a video decoding apparatus including: a memory; and at least one processor connected to the memory, wherein the at least one processor is configured to determine whether a motion vector precision of a current block is a ¼ pixel or a ¹⁄₁₆ pixel, determine a range of the motion vector to be 16 bits when the motion vector precision is a ¼ pixel, determine the range of the motion vector to be 18 bits when the motion vector precision is a ¹⁄₁₆ pixel, and perform inter prediction on the current block, based on the determined range of the motion vector.

To solve the technical problem, the disclosure provides a video encoding method including: determining whether a motion vector precision of a current block is a ¼ pixel or a ¹⁄₁₆ pixel; determining a range of the motion vector to be 16 bits when the motion vector precision is a ¼ pixel; determining the range of the motion vector to be 18 bits when the motion vector precision is a ¹⁄₁₆ pixel; and performing inter prediction on the current block, based on the determined range of the motion vector.

To solve the technical problem, the disclosure provides a video encoding apparatus including: a memory; and at least one processor connected to the memory, wherein the at least one processor is configured to determine whether a motion vector precision of a current block is a ¼ pixel or a ¹⁄₁₆ pixel, determine a range of the motion vector to be 16 bits when the motion vector precision is a ¼ pixel, determine the range of the motion vector to be 18 bits when the motion vector precision is a ¹⁄₁₆ pixel, and perform inter prediction on the current block, based on the determined range of the motion vector.

Advantageous Effects of Disclosure

In a video encoding and decoding process, a first bin of a sub-block merge index indicating a candidate motion vector of a sub-block merge mode may be obtained from a bitstream, the first bin being arithmetic-encoded using a context model, a second bin arithmetic-encoded in a bypass mode may be obtained, based on a first value obtained by arithmetic-decoding the first bin by using the context model a second value may be obtained by arithmetic-decoding the second bin in the bypass mode, and prediction on a current block may be performed in the sub-block merge mode, based on the first value and the second value, such that a processing speed with respect to the sub-block merge index may be improved.

Also, whether a motion vector precision of a current block is a ¼ pixel or a ¹⁄₁₆ pixel may be determined, when the motion vector precision is a ¼ pixel, a range of a motion vector may be determined to be 16 bits, when the motion vector precision is a ¹⁄₁₆ pixel, the range of the motion vector may be determined to be 18 bits, and inter prediction may be performed on the current block, based on the determined range of the motion vector, such that efficient inter prediction may be performed by varying the range of the motion vector according to a motion vector accuracy.

BRIEF DESCRIPTION OF DRAWINGS

FIG. 13 illustrates a process of determining a depth of a coding unit as a shape and size of the coding unit change, when the coding unit is recursively split such that a plurality of coding units are determined, according to an embodiment.

BEST MODE

Figure 1:
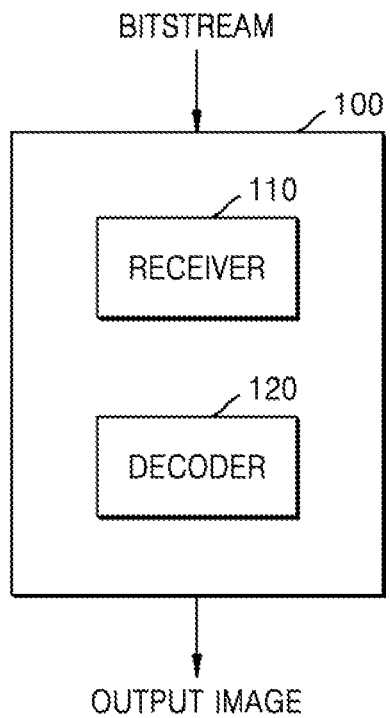
FIG. 1 illustrates a schematic block diagram of an image decoding apparatus according to an embodiment.

According to an embodiment of the disclosure, a video decoding method may include: obtaining a first bin of a sub-block merge index indicating a candidate motion vector of a sub-block merge mode, the first bin being arithmetic-encoded using a context model; obtaining a second bin arithmetic-encoded in a bypass mode, based on a first value obtained by arithmetic-decoding the first bin by using the context model; obtaining a second value by arithmetic-decoding the second bin in the bypass mode; and performing prediction on a current block in the sub-block merge mode, based on the first value and the second value.

According to an embodiment, the first value may be determined based on a probability that a sub-block unit temporal motion vector candidate will be selected.

According to an embodiment, the sub-block unit temporal motion vector candidate may be a motion vector of a temporal reference sub-block corresponding to a sub-block of the current block.

According to an embodiment, when a left adjacent block of the current block is a block encoded in an inter mode, a reference picture including the temporal reference sub-block may be equal to a reference picture indicated by a motion vector of the left adjacent block.

According to an embodiment, when a motion vector exists at a center of a reference block corresponding to the current block, the motion vector of the temporal reference sub-block corresponding to a sub-block of the current block may be derived.

According to an embodiment of the disclosure, a video encoding method may include: generating a symbol indicating a sub-block merge index indicating a candidate motion vector of a sub-block merge mode, by performing prediction on a current block in the sub-block merge mode; performing arithmetic-encoding on a first bin of the symbol by using a context model; performing bypass mode arithmetic-encoding on a second bin of the symbol, based on the first bin of the symbol; and generating a bitstream based on a result of the arithmetic-encoding using the context model and a result of the bypass mode arithmetic-encoding.

According to an embodiment, the first bin of the symbol may be determined based on a probability that a sub-block unit temporal motion vector candidate will be selected.

According to an embodiment, the sub-block unit temporal motion vector candidate may be a motion vector of a temporal reference sub-block corresponding to a sub-block of the current block.

According to another embodiment of the disclosure, a video decoding method may include: determining whether a motion vector precision of a current block is a ¼ pixel or a 1/16 pixel; determining a range of the motion vector to be 16 bits when the motion vector precision is a ¼ pixel; determining the range of the motion vector to be 18 bits when the motion vector precision is a 1/16 pixel; and performing inter prediction on the current block, based on the determined range of the motion vector.

According to an embodiment, whether the motion vector precision of the current block is a ¼ pixel or a 1/16 pixel may be determined based on a prediction mode of the current block.

According to an embodiment, when a prediction mode of the current block is an affine mode, the motion vector precision may be determined as a 1/16 pixel.

According to an embodiment, whether the motion vector precision of the current block is a ¼ pixel or a 1/16 pixel may be determined according to a flag of the motion vector precision, the flag being obtained from a bitstream.

According to an embodiment, when a prediction mode of the current block is an affine mode, the flag of the motion vector precision may be set to indicate that the motion vector precision is a 1/16 pixel.

Mode of Disclosure

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following description, terms such as "unit" indicate a software or hardware component and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some environments, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configurations.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EE-PROM), a flash memory, a magnetic or optical data storage device, registers, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform domain may be samples A unit including at least one such sample may be defined as a block.

Also, in the present specification, a "current block" may denote a block of a largest coding unit, a coding unit, a prediction unit, or a transform unit of a current image to be encoded or decoded.

Hereinafter, the disclosure will now be described more fully with reference to the accompanying drawings for one of ordinary skill in the art to be able to perform the embodiments without any difficulty. In addition, portions irrelevant to the description will be omitted in the drawings for a clear description of the disclosure.

Hereinafter, an image encoding apparatus, an image decoding apparatus, an image encoding method, and an image decoding method, according to an embodiment, will be described with reference to FIGS. 1 to 16. With reference to FIGS. 3 to 16, a method of determining a data unit of an image according to an embodiment will now be described, with reference to FIGS. 17 to 21, video encoding/decoding methods, according to an embodiment, for obtaining, from a bitstream, a first bin of a sub-block merge index indicating a candidate motion vector of a sub-block merge mode, the first bin being arithmetic-encoded using a context model, obtaining a second bin arithmetic-encoded in a bypass mode, based on a first value obtained by arithmetic-decoding the first bin by using the context model, obtaining a second value by arithmetic-decoding the second bin in the bypass mode, and performing prediction on a current block in the sub-block merge mode, based on the first value and the second value will now be described, with reference to FIGS. 22 and 23, video encoding/decoding methods, according to an embodiment, for determining whether a motion vector precision of a current block is a ¼ pixel or a ¹⁄₁₆ pixel, determining a range of a motion vector to be 16 bits when the motion vector precision is a ¼ pixel, determining the range of the motion vector to be 18 bits when the motion vector precision is a ¹⁄₁₆ pixel, and performing inter prediction on the current block, based on the determined range of the motion vector will now be described, with reference to FIG. 24, a method of storing a motion vector in an affine mode will now be described, with reference to FIG. 25, a history-based motion vector predicting method will now be described, reference to FIG. 26, a normalized motion vector will now be described, reference to FIG. 27, a method of determining a cross component linear model to determine a chroma sample of a chroma block will now be described, and reference to FIG. 28, a method of determining a linear model to compensate for local luminance will now be described.

Hereinafter, a method and apparatus for adaptively selecting a context model, based on various shapes of coding units, according to an embodiment of the disclosure, will be described with reference to FIGS. 1 and 2.

FIG. 1 illustrates a schematic block diagram of an image decoding apparatus according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described below. Also, the bitstream may be transmitted from the image encoding apparatus 2200. The image encoding apparatus 2200 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
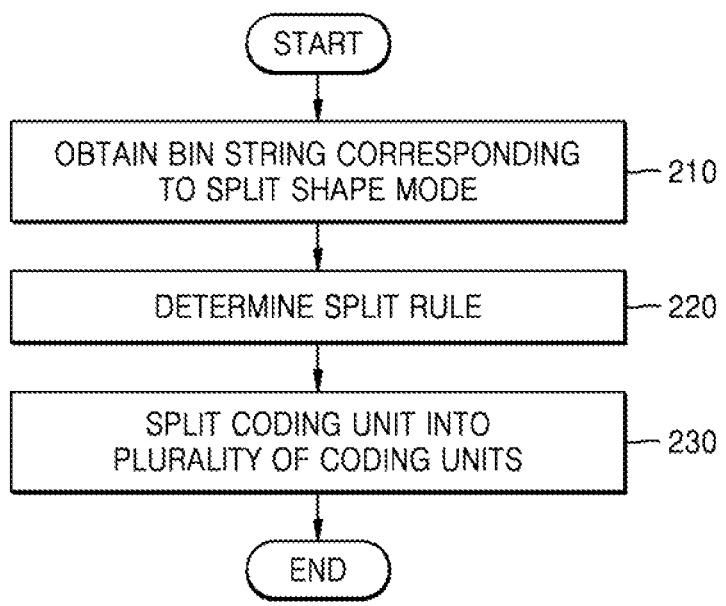
FIG. 2 illustrates a flowchart of an image decoding method according to an embodiment.

FIG. 2 illustrates a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of coding units (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transformation may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 through 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
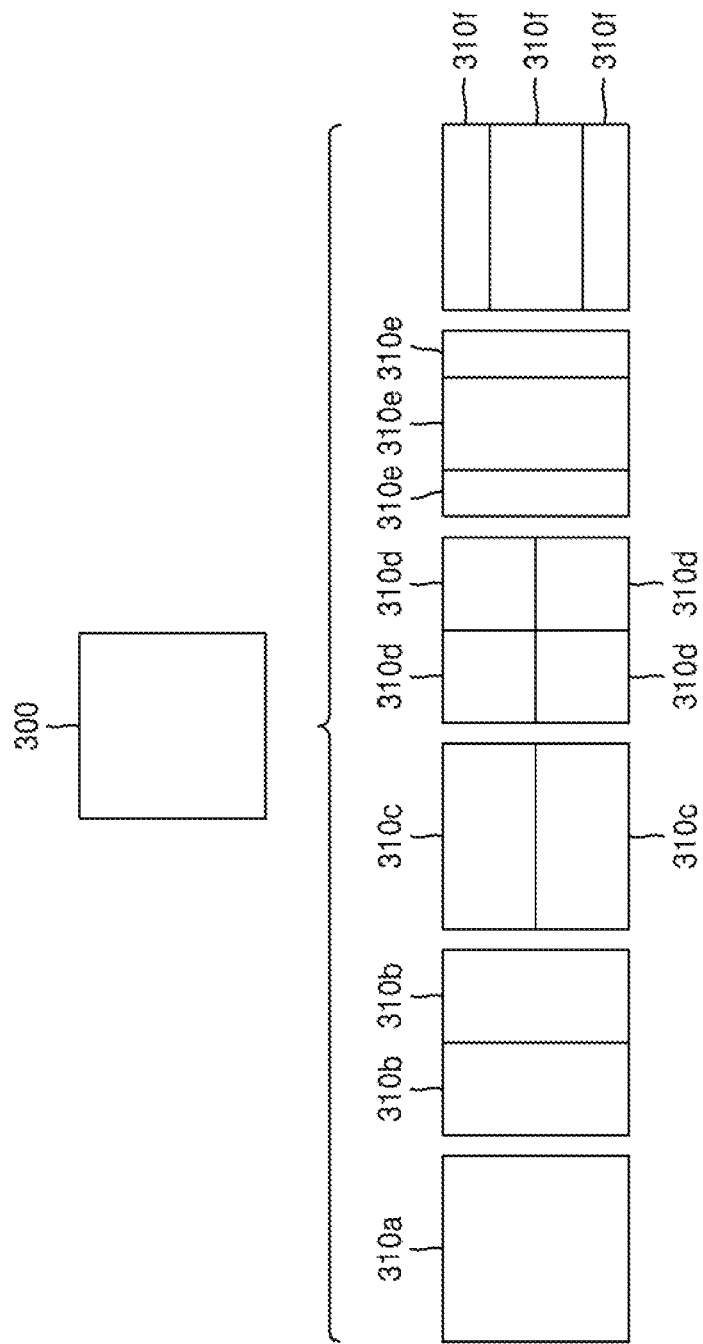
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a minimum coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, or 310f split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Predetermined splitting methods of splitting the square coding unit will be described in detail below in relation to various embodiments.

Figure 4:
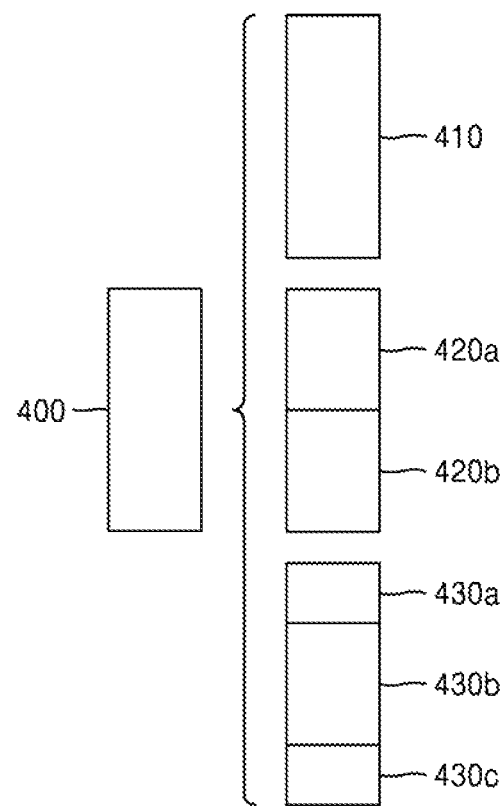
FIG. 4 illustrates a process, performed by an image decoding apparatus, of determining at least one coding unit by splitting a non-square coding unit, according to an embodiment.
Figure 4:
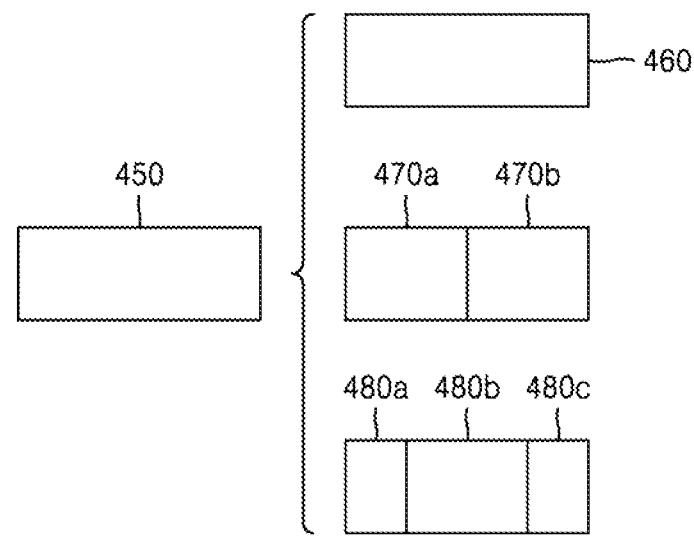

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine an odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a predetermined restriction on at least one coding unit from among the odd number of coding units generated by splitting the current coding unit 400 or 450. Referring to FIG. 4, the image decoding apparatus 100 may set a decoding process regarding the coding unit 430*b* or 480*b* located at the center among the three coding units 430*a*, 430*b*, and 430*c*, or 480*a*, 480*b*, and 480*c* generated as the current coding unit 400 or 450 is split to be different from that of the other coding units 430*a* and 430*c*, or 480*a* and 480*c*. For example, the image decoding apparatus 100 may restrict the coding unit 430*b* or 480*b* at the center location to be no longer split or to be split only a predetermined number of times, unlike the other coding units 430*a* and 430*c*, or 480*a* and 480*c*.

Figure 5:
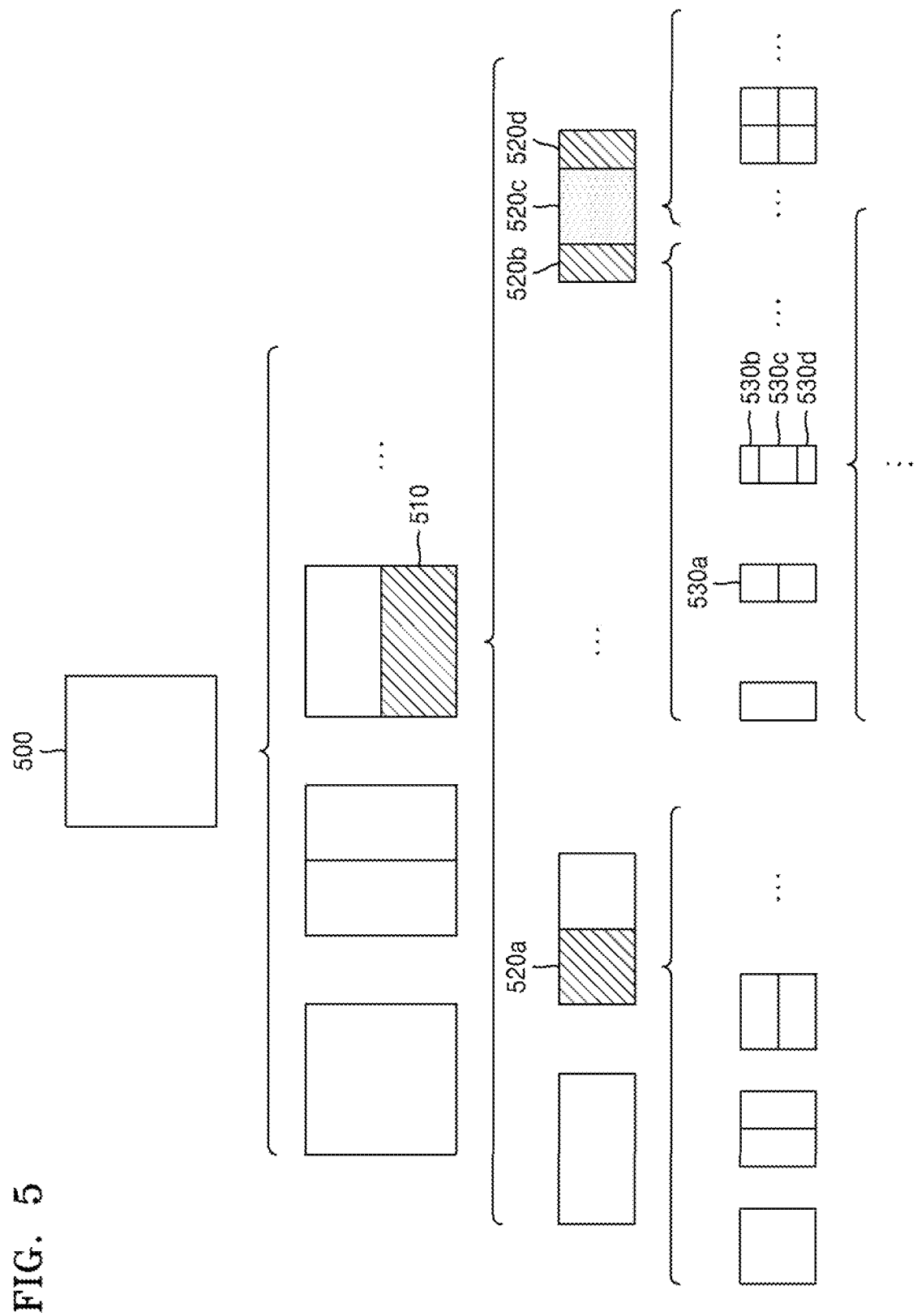
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or to not split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or to not split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520*a*, 520*b*, 520*c*, and 520*d* based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520*a*, or 520*b*, 520*c*, and 520*d*) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit (e.g., a coding unit located at a center location, or a square coding unit) from among an odd number of third coding units 520*b*, 520*c*, and 520*d* determined by splitting the non-square second coding unit 510 may be recursively split. According to an embodiment, the square third coding unit 520*b* from among the odd number of third coding units 520*b*, 520*c*, and 520*d* may be split in a horizontal direction into a plurality of fourth coding units. A non-square fourth coding unit 530*b* or 530*d* from among the plurality of fourth coding units 530*a*, 530*b*, 530*c*, and 530*d* may be re-split into a plurality of coding units. For example, the non-square fourth coding unit 530*b* or 530*d* may be re-split into an odd number of coding units. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine to not split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a predetermined restriction on a predetermined third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a predetermined location in the current coding unit.

Figure 6:
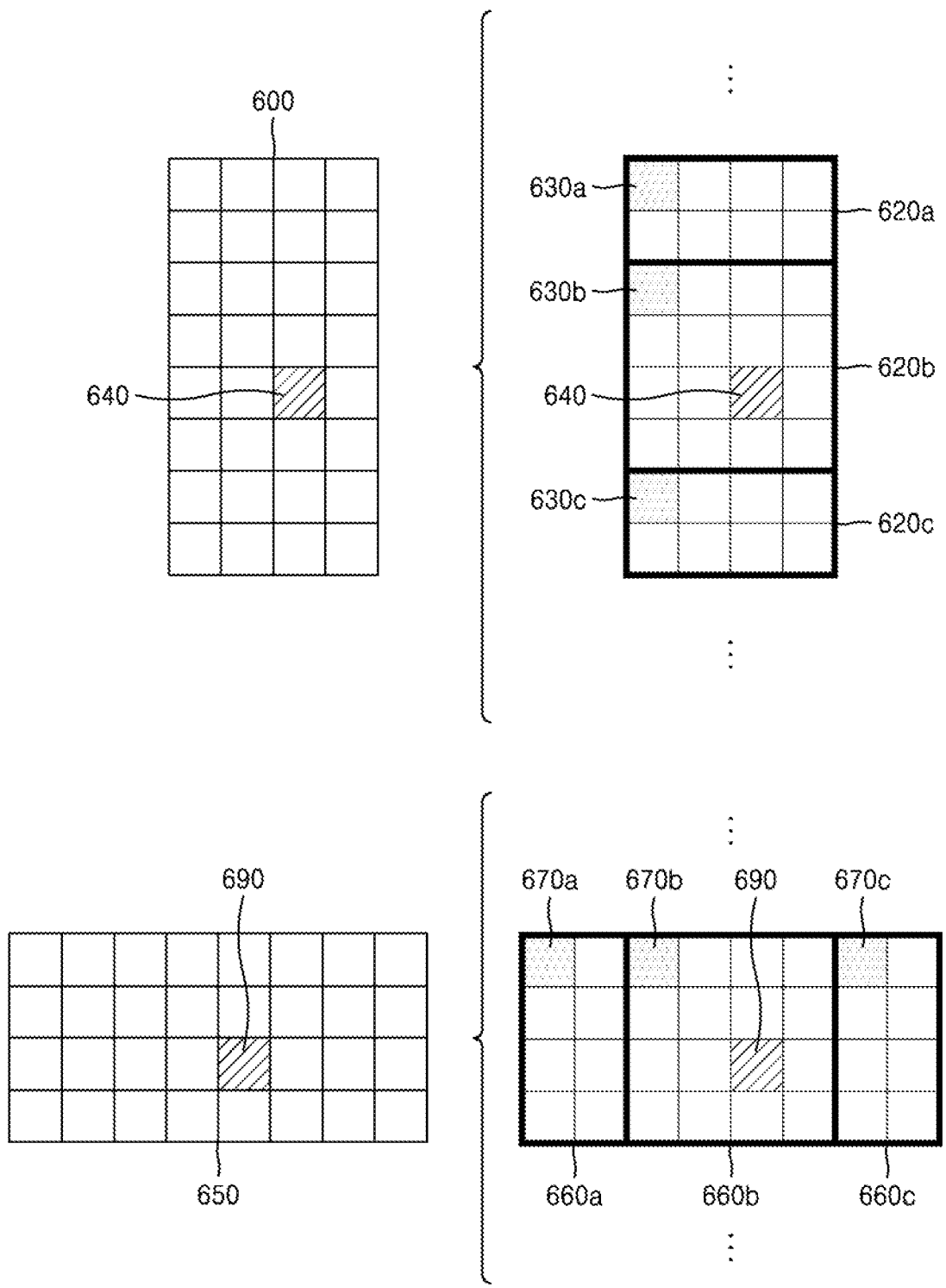
FIG. 6 illustrates a method, performed by an image decoding apparatus, of determining a predetermined coding unit from among an odd number of coding units, according to an embodiment.

FIG. 6 illustrates a method, performed by an image decoding apparatus, of determining a predetermined coding unit from among an odd number of coding units, according to an embodiment.

Referring to FIG. 6, split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the predetermined location and may determine to split or to not split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of predetermined samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper-left samples 630*a*, 630*b*, and 630*c* of the coding units 620*a*, 620*b*, and 620*c*.

According to an embodiment, the information indicating the locations of the upper-left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper-left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper-left sample 630*a* of the upper coding unit 620*a* may include coordinates (xa, ya), information indicating the location of the upper-left sample 630*b* of the center coding unit 620*b* may include coordinates (xb, yb), and information indicating the location of the upper-left sample 630*c* of the lower coding unit 620*c* may include coordinates (xc, yc). The image decoding apparatus 100 may determine the middle coding unit 620*b* by using the coordinates of the upper-left samples 630*a*, 630*b*, and 630*c* which are included in the coding units 620*a*, 620*b*, and 620*c*, respectively. For example, when the coordinates of the upper-left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper-left samples 630*a*, 630*b*, and 630*c* may include coordinates indicating absolute locations in the picture, or may use coordinates (dxb, dyb) indicating a relative location of the upper-left sample 630*b* of the middle coding unit 620*b* and coordinates (dxc, dyc) indicating a relative location of the upper-left sample 630*c* of the lower coding unit 620*c* with reference to the location of the upper-left sample 630*a* of the upper coding unit 620*a*. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a predetermined criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the upper-left sample 630*a* of the upper coding unit 620*a*, the coordinates (xb, yb) that is the information indicating the location of the upper-left sample 630*b* of the middle coding unit 620*b*, and the coordinates (xc, yc) that are the information indicating the location of the upper-left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb-ya. According to an embodiment, the image decoding apparatus 100 may determine the width of the middle coding unit 620*b* to be the width of the current coding unit 600. The image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 or the widths or heights of the upper and middle coding units 620*a* and 620*b*. The image decoding apparatus 100 may determine a coding unit, which has a size different from that of the others, based on the determined widths and heights of the coding units 620*a*, 620*b*, and 620*c*. Referring to FIG. 6, the image decoding apparatus 100 may determine the middle coding unit 620*b*, which has a size different from the size of the upper and lower coding units 620*a* and 620*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660a, 660b, and 660c by using the coordinates (xd, yd) that are information indicating the location of an upper-left sample 670a of the left coding unit 660a, the coordinates (xe, ye) that are information indicating the location of an upper-left sample 670b of the middle coding unit 660b, and the coordinates (xf, yf) that are information indicating a location of the upper-left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the sizes of the left and right coding units 660a and 660c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600) to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620*b* including a sample, from which predetermined information (e.g., the split shape mode information) can be obtained, from among the plurality of coding units 620*a*, 620*b*, and 620*c* determined by splitting the current coding unit 600, and may put a predetermined restriction on the coding unit 620*b*. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620*b* including the sample 640, in a decoding operation. However, the location of the sample from which the predetermined information can be obtained is not limited to the above-described location, and may include arbitrary locations of samples included in the coding unit 620*b* to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information can be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information can be obtained.

According to an embodiment, when the current coding unit is split into a plurality of coding units, the image decoding apparatus 100 may use the split shape mode information to determine a coding unit at a predetermined location from among the plurality of coding units. According to an embodiment, the image decoding apparatus 100 may obtain the split shape mode information from a sample at a predetermined location in a coding unit, and may split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
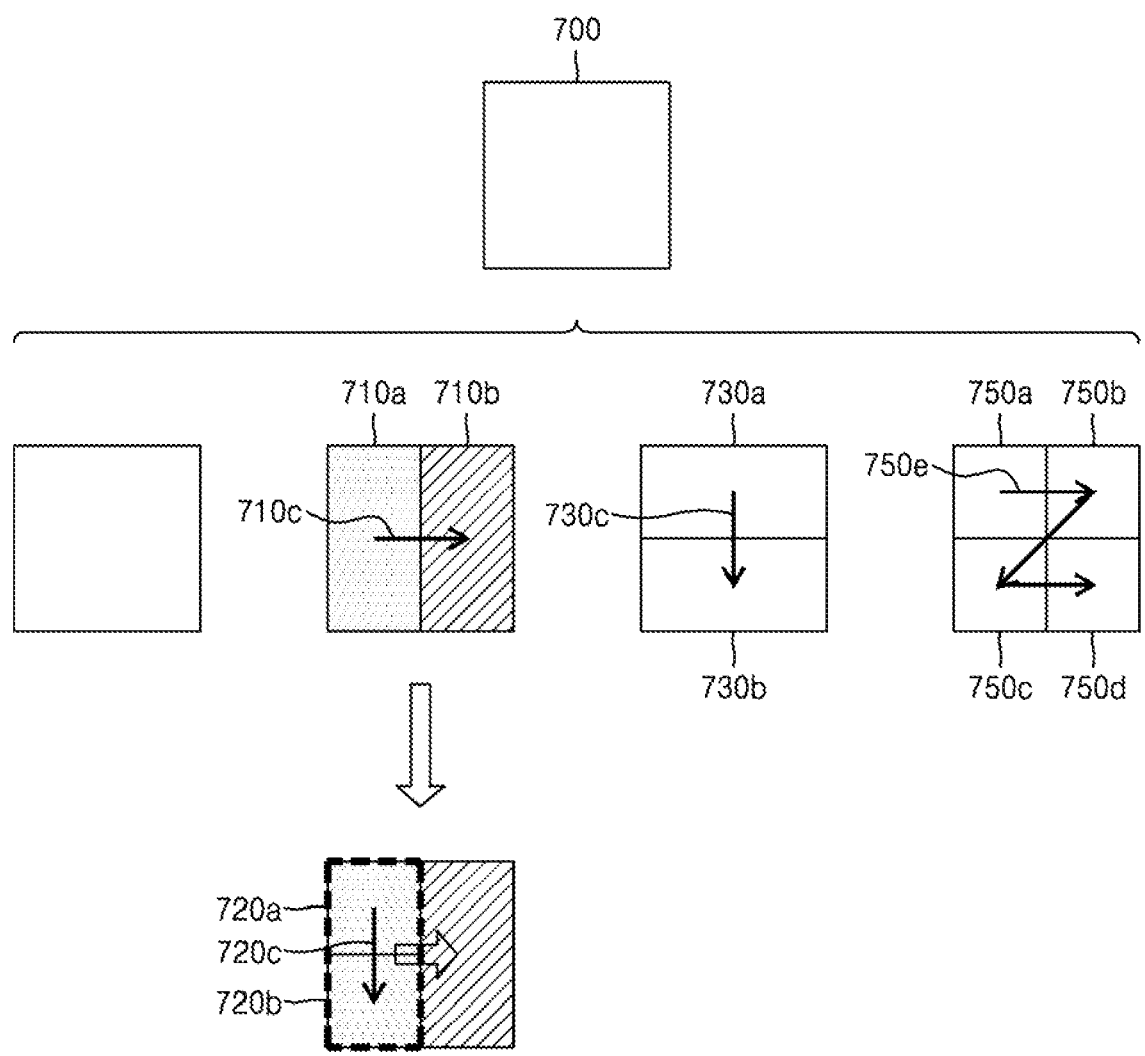
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710*a* and 710*b* by splitting a first coding unit 700 in a vertical direction, may determine second coding units 730*a* and 730*b* by splitting the first coding unit 700 in a horizontal direction, or may determine second coding units 750*a*, 750*b*, 750*c*, and 750*d* by splitting the first coding unit 700 in vertical and horizontal directions, based on split shape mode information.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 700 in a horizontal direction, in a vertical direction order 730*c*. The image decoding apparatus 100 may determine the second coding units 750*a*, 750*b*, 750*c*, and 750*d*, which are determined by splitting the first coding unit 700 in vertical and horizontal directions, according to a predetermined order (e.g., a raster scan order or Z-scan order 750*e*) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710*a* and 710*b*, 730*a* and 730*b*, or 750*a*, 750*b*, 750*c*, and 750*d* by splitting the first coding unit 700, and may recursively split each of the determined plurality of coding units 710*a*, 710*b*, 730*a*, 730*b*, 750*a*, 750*b*, 750*c*, and 750*d*. A splitting method of the plurality of coding units 710*a* and 710*b*, 730*a* and 730*b*, or 750*a*, 750*b*, 750*c*, and 750*d* may correspond to a splitting method of the first coding unit 700. Accordingly, each of the plurality of coding units 710*a* and 710*b*, 730*a* and 730*b*, or 750*a*, 750*b*, 750*c*, and 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or to not split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a predetermined order.

Figure 8:
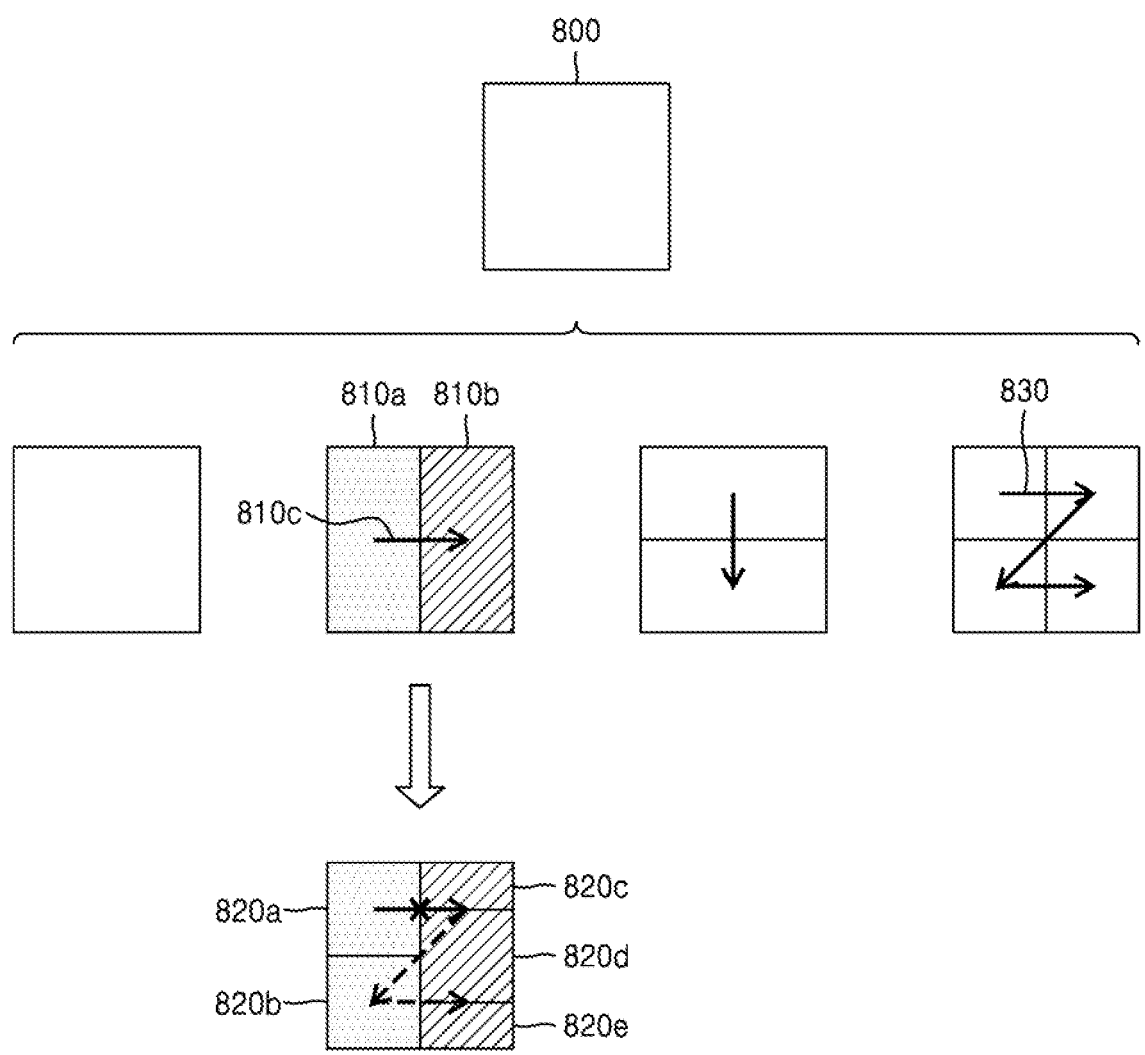
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by an image decoding apparatus, of determining that a current coding unit is to be split into an odd number of coding units, when the coding units are not processable in a predetermined order, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c*, 820*d*, and 820*e*. According to an embodiment, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c*, 820*d*, and 820*e*.

According to an embodiment, the video decoding apparatus 100 may determine whether any coding unit is split into an odd number of coding units, by determining whether the third coding units 820*a* and 820*b*, and 820*c*, 820*d*, and 820*e* are processable in a predetermined order. Referring to FIG. 8, the image decoding apparatus 100 may determine the third coding units 820*a* and 820*b*, and 820*c*, 820*d*, and 820*e* by recursively splitting the first coding unit 800. The image decoding apparatus 100 may determine whether any of the first coding unit 800, the second coding units 810*a* and 810*b*, or the third coding units 820*a* and 820*b*, and 820*c*, 820*d*, and 820*e* are split into an odd number of coding units, based on at least one of the block shape information and the split shape mode information. For example, a coding unit located in the right from among the second coding units 810*a* and 810*b* may be split into an odd number of third coding units 820*c*, 820*d*, and 820*e*. A processing order of a plurality of coding units included in the first coding unit 800 may be a predetermined order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the predetermined order.

According to an embodiment, the image decoding apparatus 100 may determine whether the third coding units 820*a* and 820*b*, and 820*c*, 820*d*, and 820*e* included in the first coding unit 800 satisfy the condition for processing in the predetermined order, and the condition relates to whether at least one of a width and height of the second coding units 810*a* and 810*b* is to be split in half along a boundary of the third coding units 820*a* and 820*b*, and 820*c*, 820*d*, and 820*e*. For example, the third coding units 820*a* and 820*b* determined when the height of the left second coding unit 810*a* of the non-square shape is split in half may satisfy the condition. It may be determined that the third coding units 820*c*, 820*d*, and 820*e* do not satisfy the condition because the boundaries of the third coding units 820*c*, 820*d*, and 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 9:
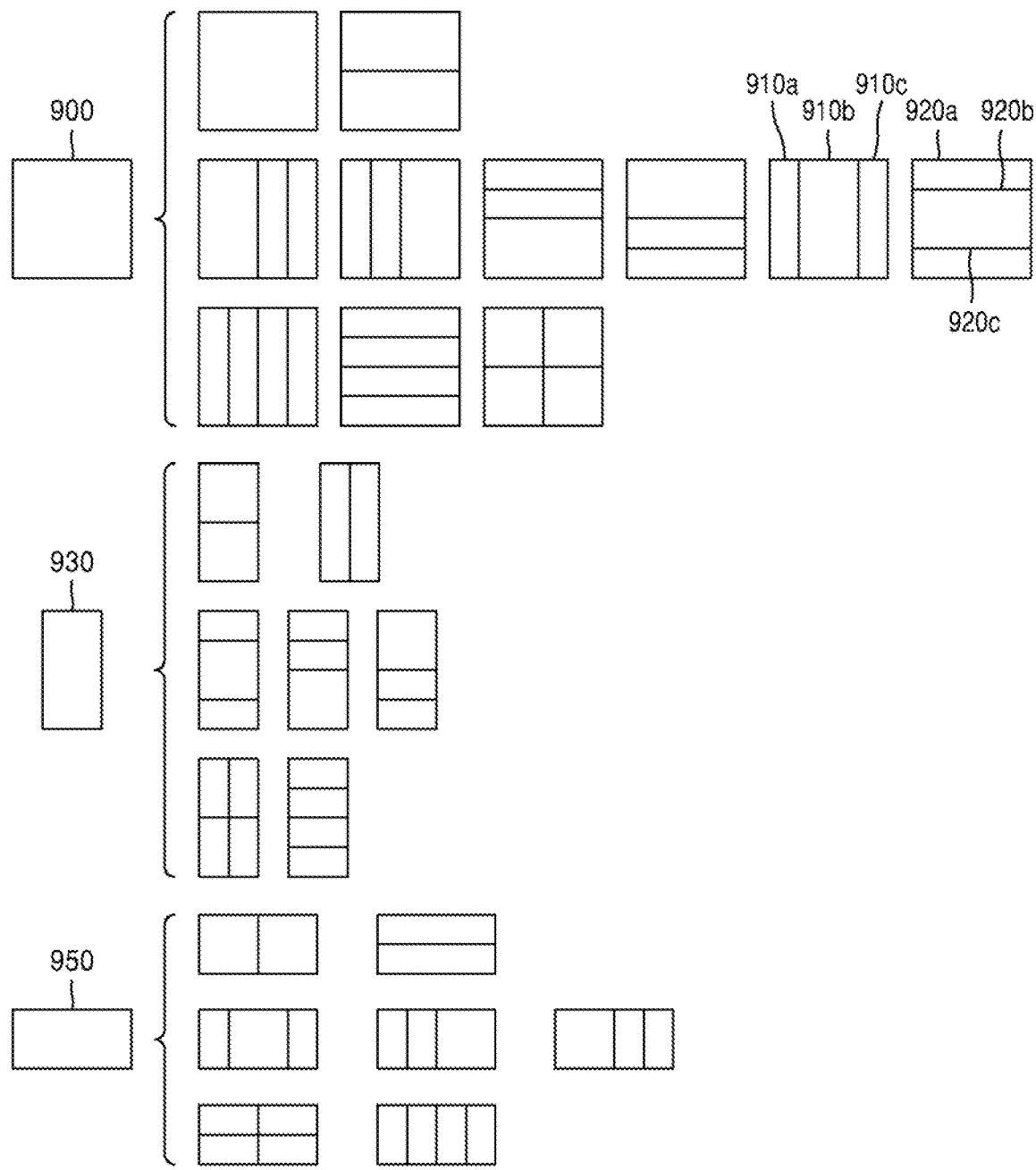
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a predetermined order, and the condition relates to whether at least one of a width and height of the first coding unit 900 is to be split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the predetermined order. Also, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
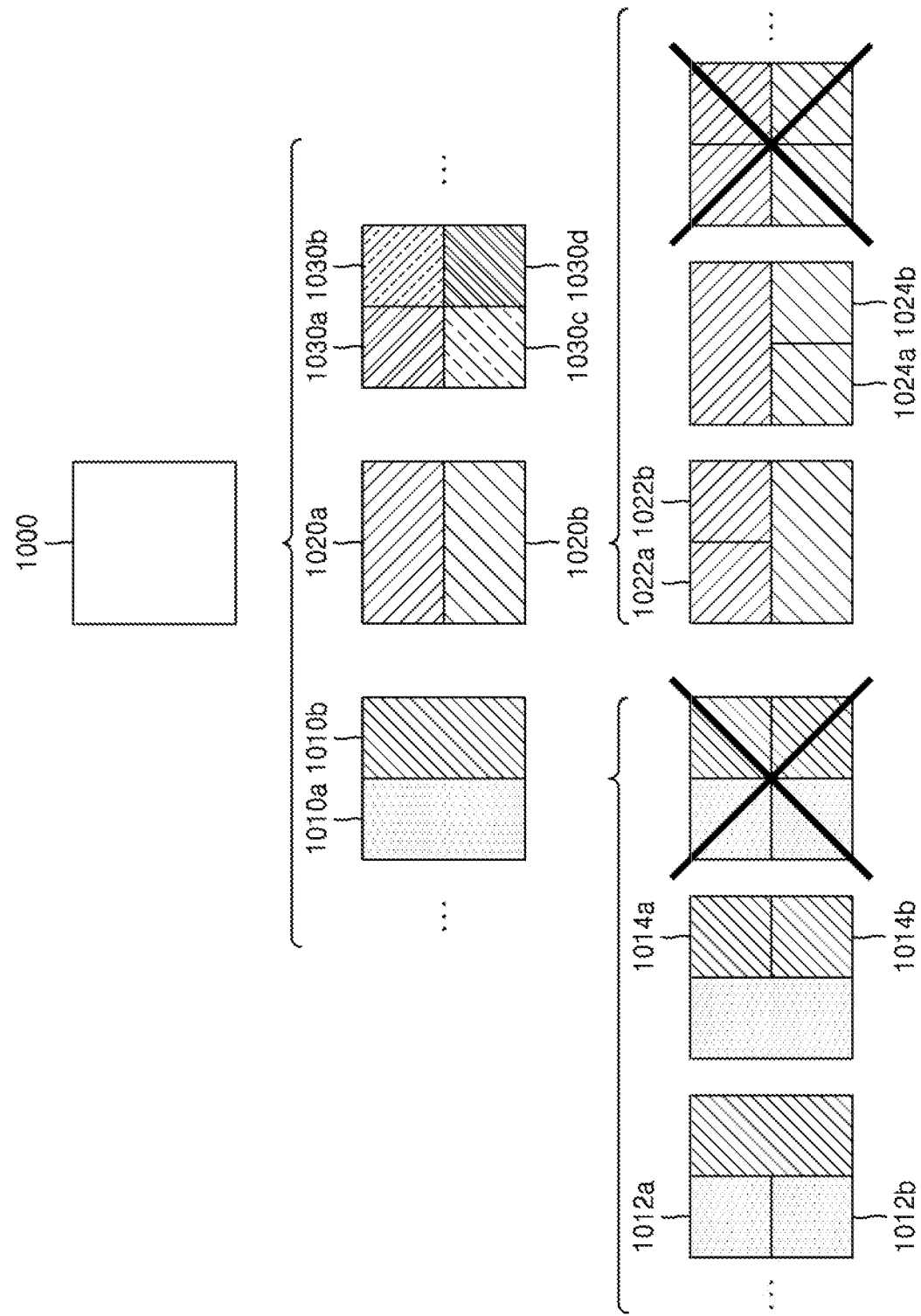
FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the receiver 110. The second coding units 1010a and 1010b, or 1020a and 1020b may be independently split. As such, the image decoding apparatus 100 may determine to split or to not split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
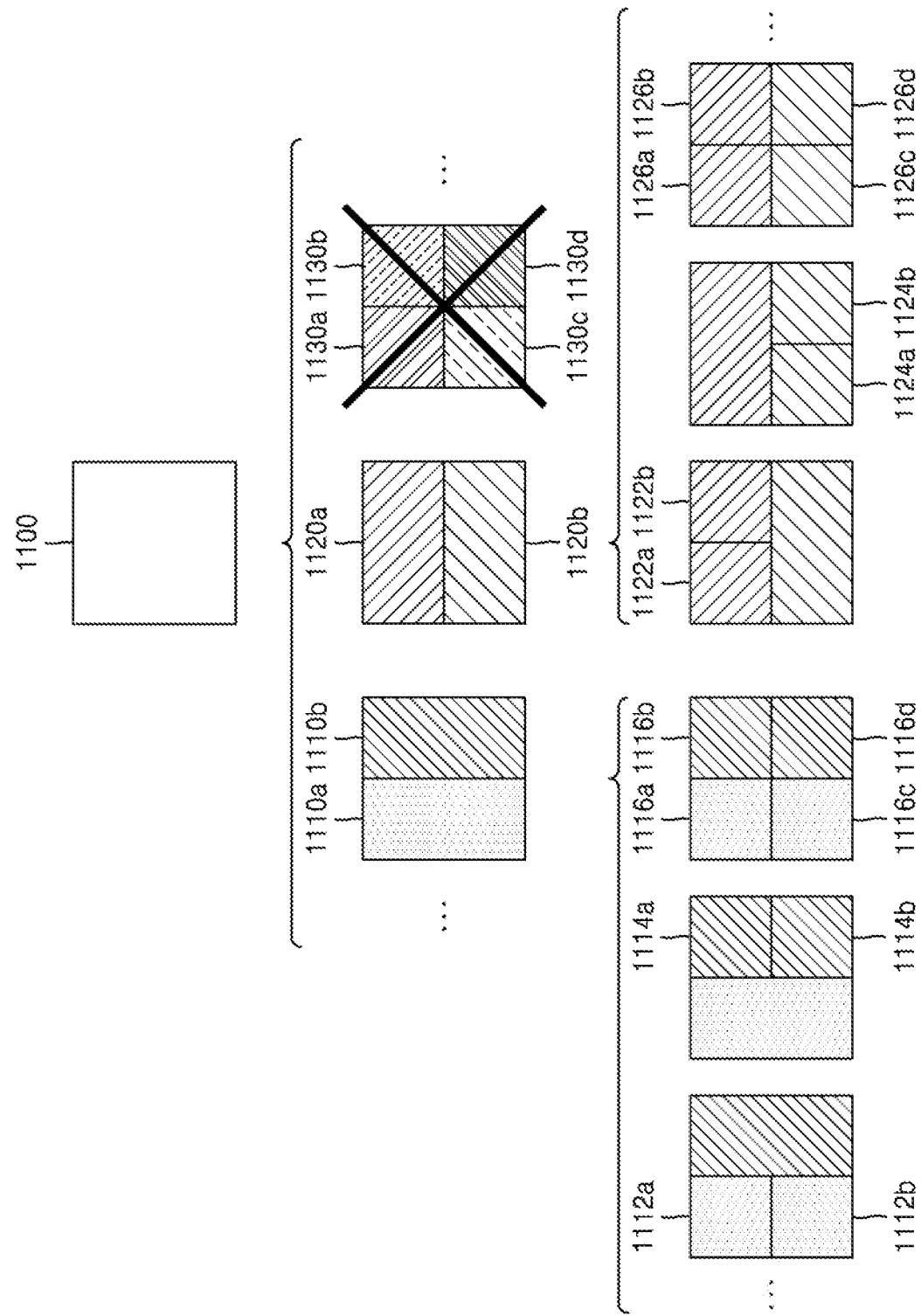
FIG. 11 illustrates a process, performed by an image decoding apparatus, of splitting a square coding unit when split shape mode information indicates that the square coding unit is to not be split into four square coding units, according to an embodiment.

FIG. 11 illustrates a process, performed by an image decoding apparatus, of splitting a square coding unit when split shape mode information indicates that the square coding unit is to not be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a predetermined order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
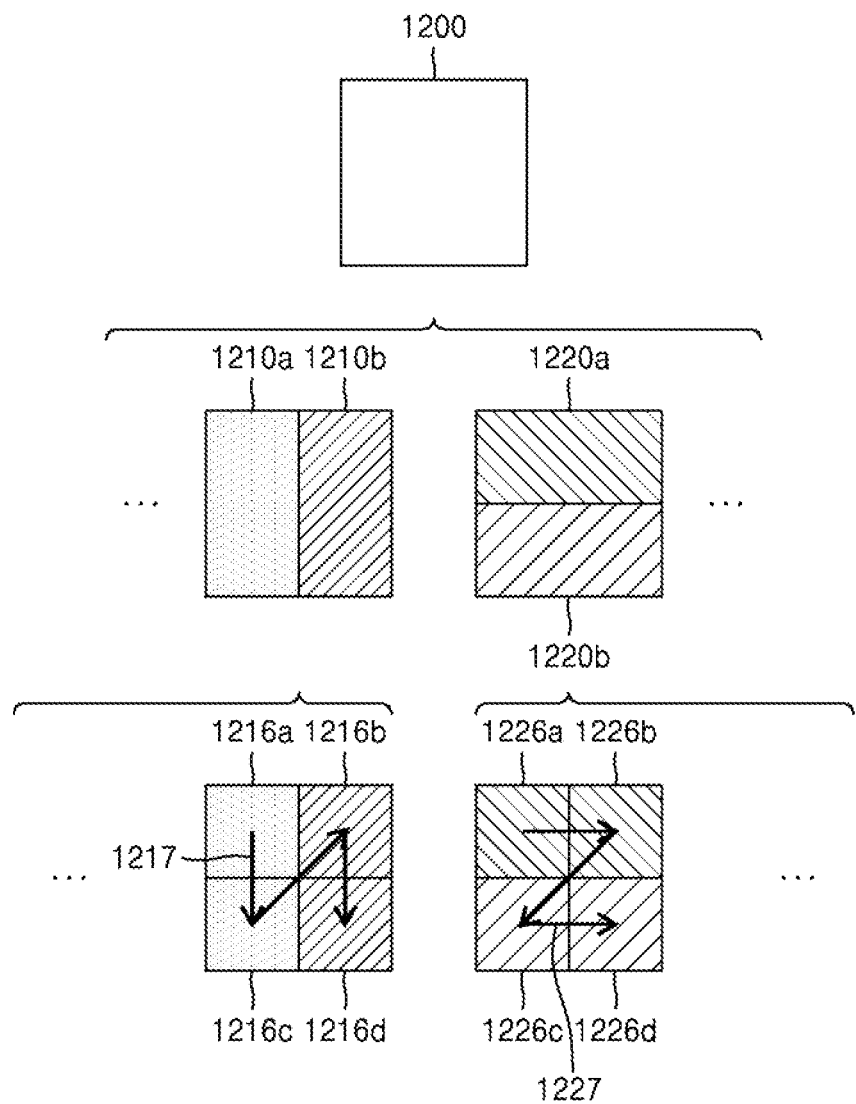
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
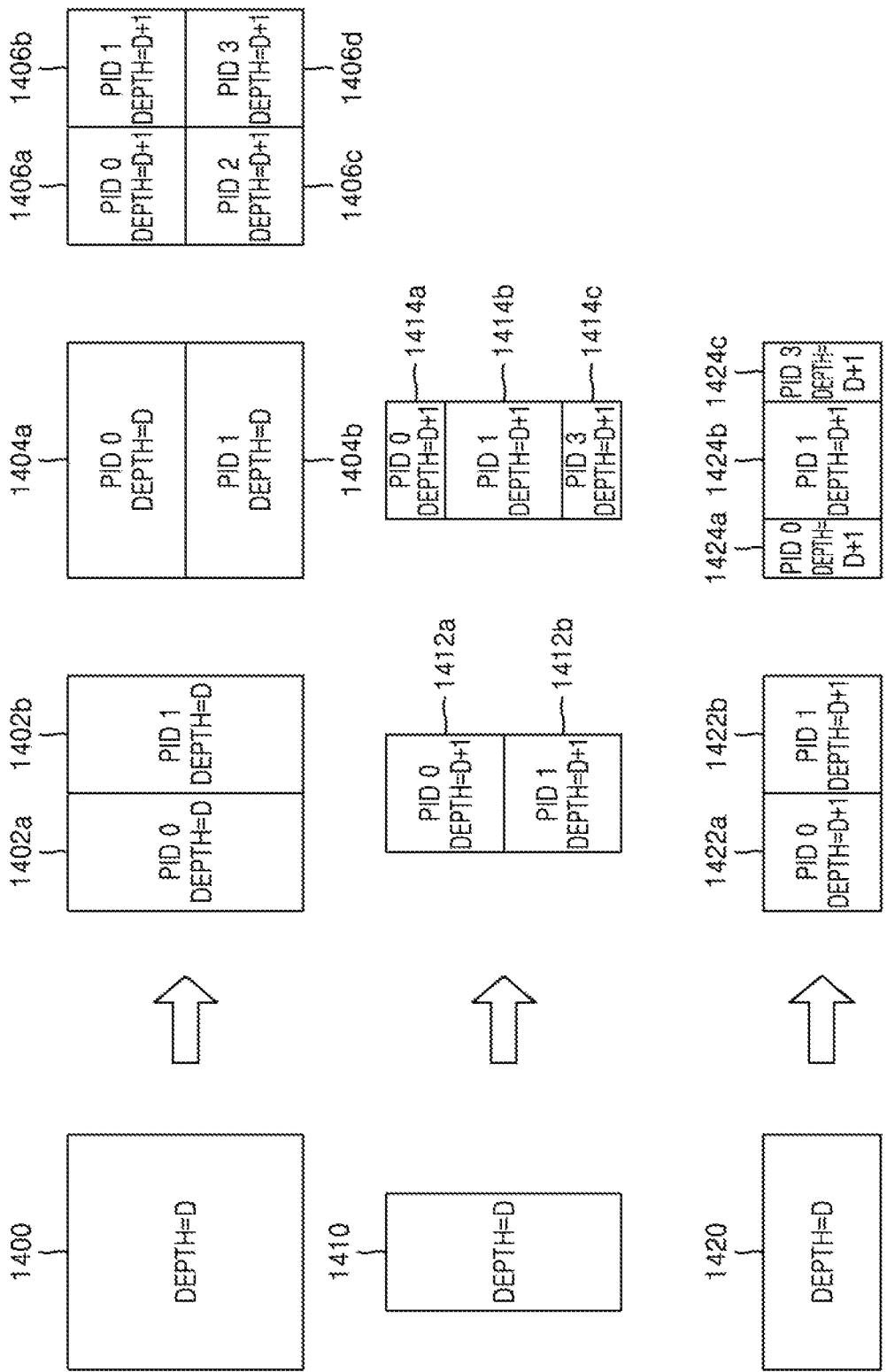
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a predetermined location of each coding unit (e.g., an upper-left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
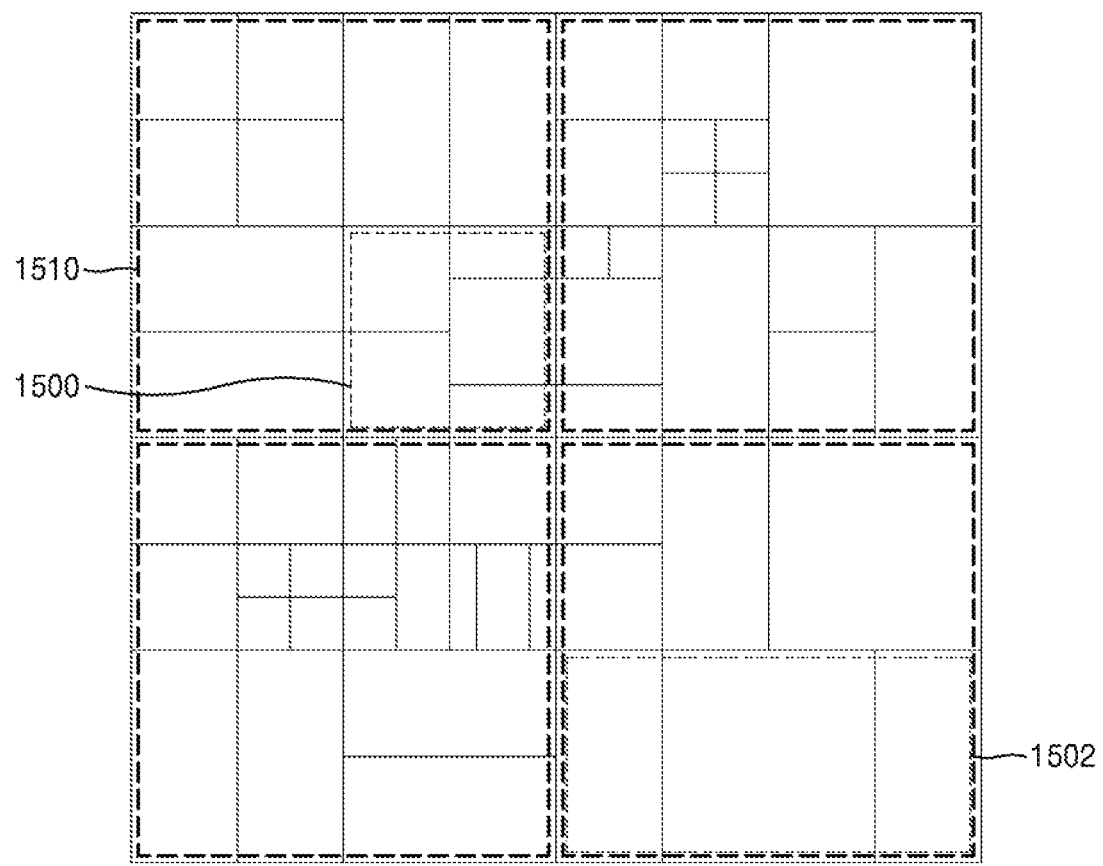
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver 110 may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
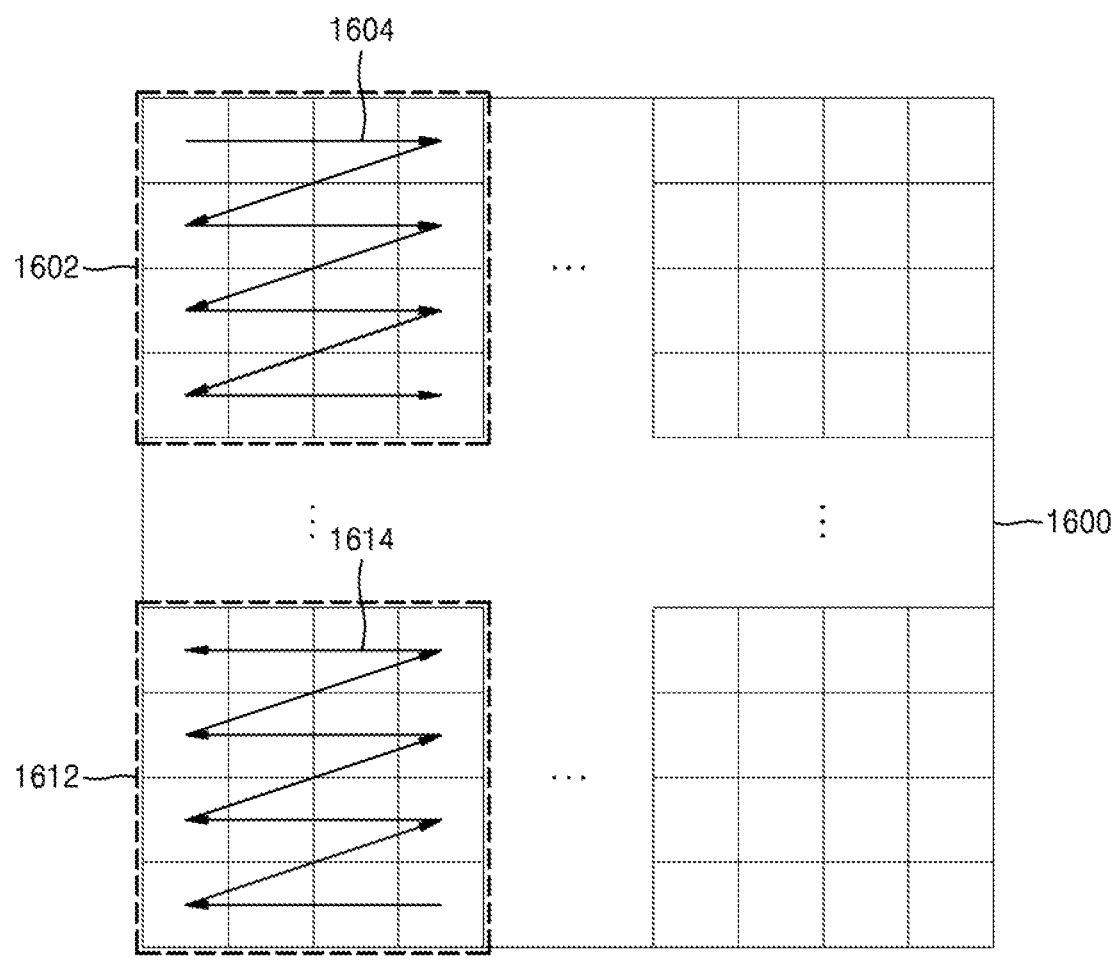
FIG. 16 illustrates a processing block serving as a unit for determining a determination order of reference coding units included in a picture, according to an embodiment.

FIG. 16 illustrates a processing block serving as a unit for determining a determination order of reference coding units included in a picture, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, slice segment, tile, or tile group. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 2200 and the image decoding apparatus 100 may pre-determine to determine the split rule based on the block shape of the coding unit. However, the embodiment is not limited thereto. The image decoding apparatus 100 may determine the split rule based on the information obtained from the bitstream received from the image encoding apparatus 2200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 2200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders is described above with reference to FIG. 12, details thereof are not provided again.

Hereinafter, with reference to FIGS. 17 to 20, provided are a method and apparatus for encoding or decoding a video, in which a first bin of a sub-block merge index indicating a candidate motion vector of a sub-block merge mode is obtained, the first bin being arithmetic-encoded using a context model, a second bin arithmetic-encoded in a bypass mode is obtained based on a first value obtained by arithmetic-decoding the first bin by using the context model, a second value is obtained by arithmetic-decoding the second bin in the bypass mode, and prediction on a current block is performed in the sub-block merge mode, based on the first value and the second value.

Figure 17:
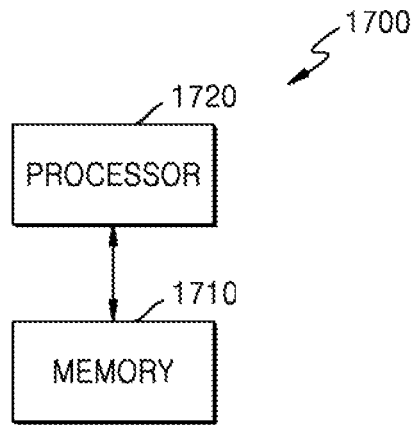
FIG. 17 illustrates a block diagram of a video encoding apparatus according to an embodiment.

FIG. 17 is a block diagram of a video encoding apparatus according to an embodiment.

A video encoding apparatus 1700 according to an embodiment may include a memory 1710, and at least one processor 1720 connected to the memory 1710. Operations of the video encoding apparatus 1700 according to an embodiment may be performed by individual processors or by a control of a central processor. Also, the memory 1710 of the video encoding apparatus 1700 may store data received from outside, and data generated by the processor, for example, a first bin and a second bin of a symbol indicating the sub-block merge index, or the like.

The processor 1720 of the video encoding apparatus 1700 may perform prediction on a current block in a sub-block merge mode so as to generate a symbol indicating a sub-block merge index indicating a candidate motion vector of the sub-block merge mode, may perform arithmetic-encoding on a first bin of the symbol by using a context model, may perform bypass mode arithmetic-encoding on a second bin of the symbol based on the first bin of the symbol, and may generate a bitstream based on a result of the arithmetic-encoding using the context model and a result of the bypass mode arithmetic-encoding.

Figure 18:
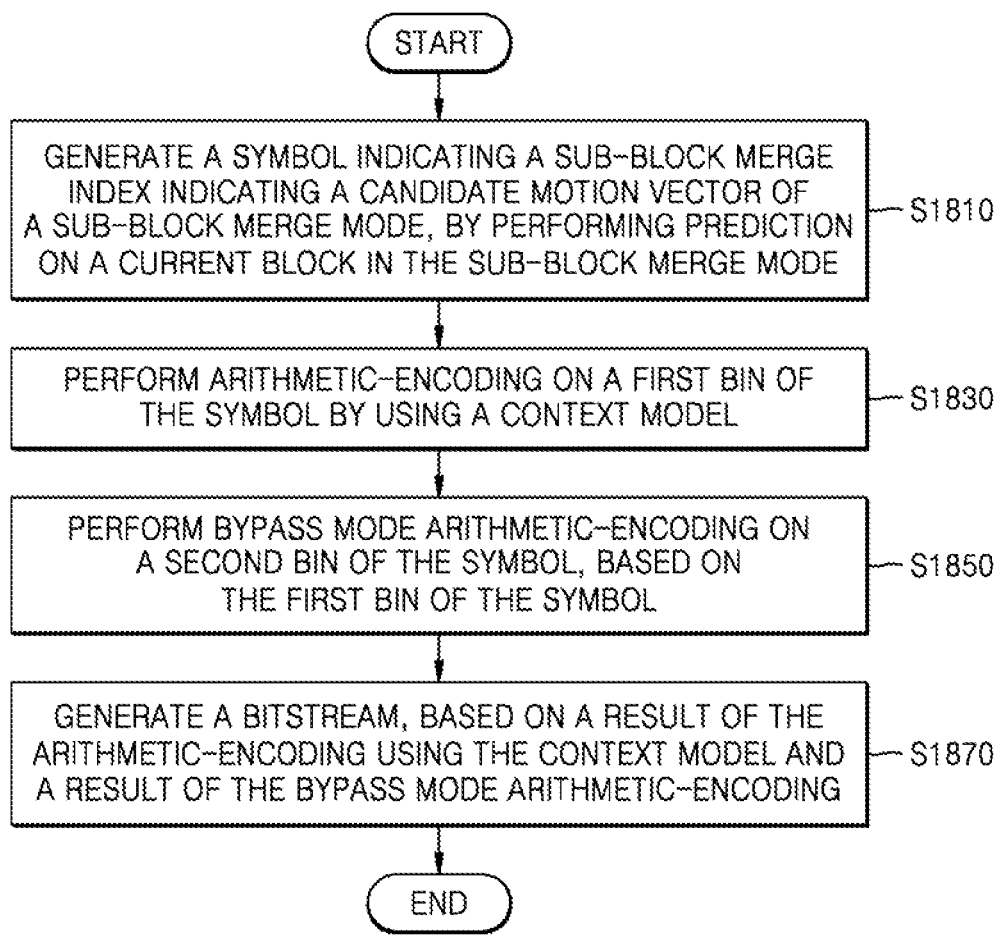
FIG. 18 illustrates a flowchart of a video encoding method according to an embodiment.

Hereinafter, with reference to FIG. 18, provided are detailed operations of a video encoding method by which the video encoding apparatus 1700 performs prediction on a current block in a sub-block merge mode so as to generate a symbol indicating a sub-block merge index indicating a candidate motion vector of the sub-block merge mode, performs arithmetic-encoding on a first bin of the symbol by using a context model, performs bypass mode arithmetic-encoding on a second bin of the symbol based on the first bin of the symbol, and generates a bitstream based on a result of the arithmetic-encoding using the context model and a result of the bypass mode arithmetic-encoding.

FIG. 18 is a flowchart illustrating a video encoding method according to an embodiment.

Referring to FIG. 18, in operation S1810, a symbol indicating a sub-block merge index indicating a candidate motion vector of a sub-block merge mode may be generated by performing prediction on a current block in the sub-block merge mode.

According to an embodiment, the symbol indicating the sub-block merge index may be represented using truncated unary coding.

In operation S1830, the video encoding apparatus 1700 may perform arithmetic-encoding on a first bin of the symbol by using a context model.

According to an embodiment, the first bin of the symbol may be determined based on a probability that a sub-block unit temporal motion vector candidate will be selected. The "sub-block unit temporal motion vector candidate" will be described below with reference to FIG. 21.

According to an embodiment, the sub-block unit temporal motion vector candidate may be a motion vector of a temporal reference sub-block corresponding to a sub-block of the current block.

According to an embodiment, when a left adjacent block of the current block is a block encoded in an inter mode, a reference picture including the temporal reference sub-block may be equal to a reference picture indicated by a motion vector of the left adjacent block.

According to an embodiment, when a motion vector exists at a center of a reference block corresponding to the current block, the motion vector of the temporal reference sub-block corresponding to a sub-block of the current block may be derived.

According to another embodiment, the arithmetic-encoding using a context model may involve using two context models, instead of one model.

In operation S1850, the video encoding apparatus 1700 may perform bypass mode arithmetic-encoding on a second bin of the symbol based on the first bin of the symbol.

In detail, because truncated unary coding is performed on the symbol indicating the sub-block merge index, whether to perform the bypass mode arithmetic-encoding may be determined based on the first bin of the symbol.

In operation S1870, a bitstream may be generated based on a result of the arithmetic-encoding using the context model and a result of the bypass mode arithmetic-encoding.

According to an embodiment, when it is determined to not perform the bypass mode arithmetic-encoding, the bitstream may be generated based on only the result of the arithmetic-encoding using the context model.

According to an embodiment, the first bin may be one bit, and the second bin may be at least one bit.

According to another embodiment, the sub-block merge mode may be an affine merge mode.

Figure 19:
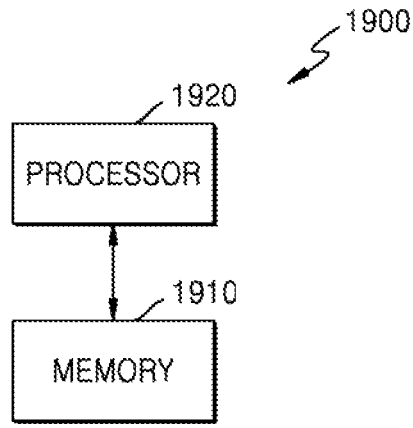
FIG. 19 illustrates a block diagram of a video decoding apparatus according to an embodiment.
Figure 20:
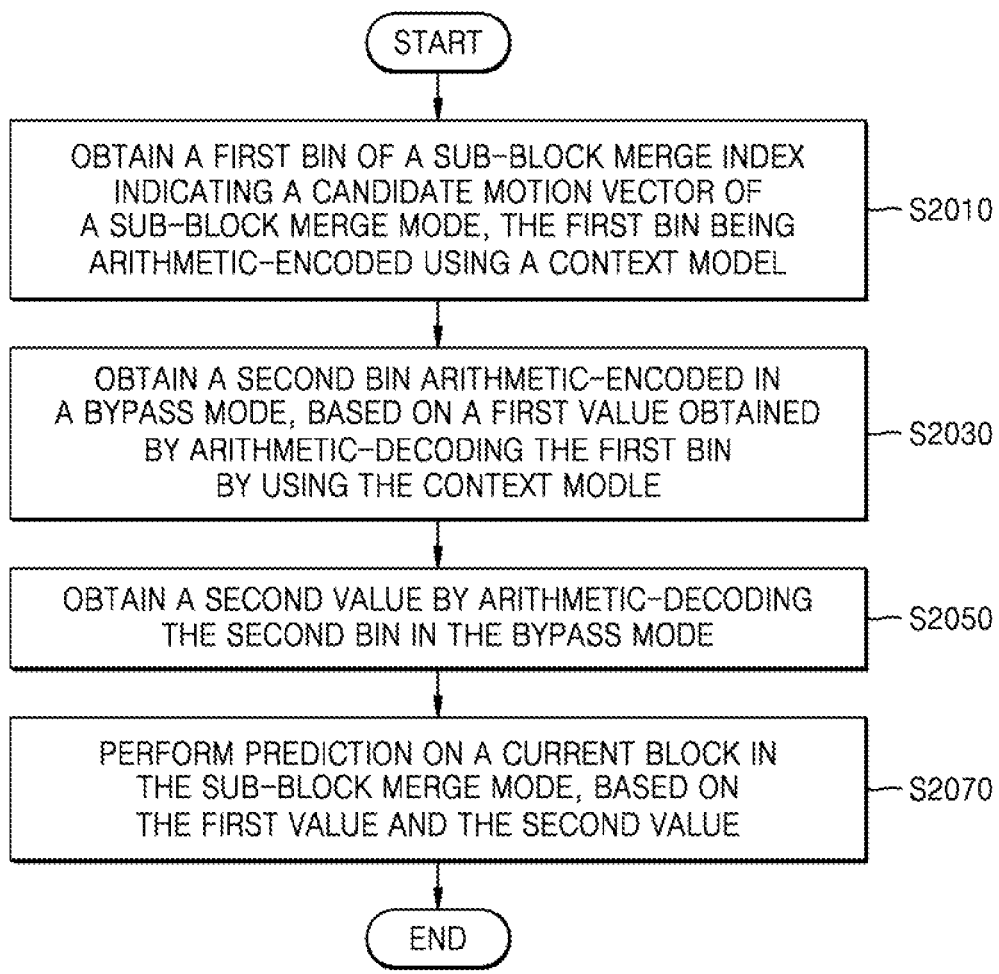
FIG. 20 illustrates a flowchart of a video decoding method according to an embodiment.

FIGS. 19 and 20 illustrate a block diagram of a video decoding apparatus according to an embodiment and a flowchart of a video decoding method according to an embodiment, respectively corresponding to the video encoding apparatus and the video encoding method described above.

FIG. 19 illustrates a block diagram of a video decoding apparatus according to an embodiment.

A video decoding apparatus 1900 according to an embodiment may include a memory 1910, and at least one processor 1920 connected to the memory 1910. Operations of the video decoding apparatus 1900 according to an embodiment may be performed by individual processors or by a control of a central processor. Also, the memory 1910 of the video decoding apparatus 1900 may store data received from outside, and data generated by the processor, for example, a first bin of a sub-block merge index indicating a candidate motion vector of a sub-block merge mode, the first bin being arithmetic-encoded using a context model, a second bin arithmetic-encoded in a bypass mode, or the like.

The processor 1920 of the video decoding apparatus 1900 may obtain a first bin of a sub-block merge index indicating a candidate motion vector of a sub-block merge mode, the first bin being arithmetic-encoded using a context model, may obtain a second bin arithmetic-encoded in a bypass mode, based on a first value obtained by arithmetic-decoding the first bin by using the context model, may obtain a second value by arithmetic-decoding the second bin in the bypass mode, and may perform prediction on a current block in the sub-block merge mode, based on the first value and the second value.

Hereinafter, with reference to FIG. 20, provided are detailed operations of a video decoding method by which the video decoding apparatus 1900 obtains a first bin of a sub-block merge index indicating a candidate motion vector of a sub-block merge mode, the first bin being arithmetic-encoded using a context model, obtains a second bin arithmetic-encoded in a bypass mode, based on a first value obtained by arithmetic-decoding the first bin by using the context model, obtains a second value by arithmetic-decoding the second bin in the bypass mode, and performs prediction on a current block in the sub-block merge mode, based on the first value and the second value.

FIG. 20 illustrates a flowchart of a video decoding method according to an embodiment.

Referring to FIG. 20, in operation S2010, a first bin of a sub-block merge index indicating a candidate motion vector of a sub-block merge mode may be obtained, the first bin being arithmetic-encoded using a context model.

In operation S2030, the video decoding apparatus 1900 may obtain a second bin arithmetic-encoded in a bypass mode, based on a first value obtained by arithmetic-decoding the first bin by using the context model.

In detail, because truncated unary coding is used, whether to perform the arithmetic-decoding in the bypass mode may be determined based on a first value obtained by arithmetic-decoding the first bin using the context model, the first bin being arithmetic-encoded using the context model According to an embodiment, the first bin of the symbol may be determined based on a probability that a sub-block unit temporal motion vector candidate will be selected. According to an embodiment, the sub-block unit temporal motion vector candidate may be a motion vector of a temporal reference sub-block corresponding to a sub-block of the current block.

According to an embodiment, when a left adjacent block of the current block is a block decoded in an inter mode, a reference picture including the temporal reference sub-block may be equal to a reference picture indicated by a motion vector of the left adjacent block.

According to an embodiment, when a motion vector exists at a center of a reference block corresponding to the current block, the motion vector of the temporal reference sub-block corresponding to a sub-block of the current block may be derived.

According to an embodiment, the first bin may be one bit, and the second bin may be at least one bit.

According to another embodiment, the arithmetic-decoding using a context model may involve using two context models, instead of one model.

In operation S2050, the video decoding apparatus 1900 may obtain a second value by arithmetic-decoding the second bin in the bypass mode.

In operation S2070, the video decoding apparatus 1900 may perform prediction on a current block in the sub-block merge mode, based on the first value and the second value.

According to an embodiment, when it is determined to not perform the arithmetic-decoding in the bypass mode, prediction may be performed on the current block in the sub-block merge mode, based on only the first value.

According to an embodiment, the symbol indicating the sub-block merge index may be represented using truncated unary coding.

According to another embodiment, the sub-block merge mode may be an affine merge mode.

Figure 21:
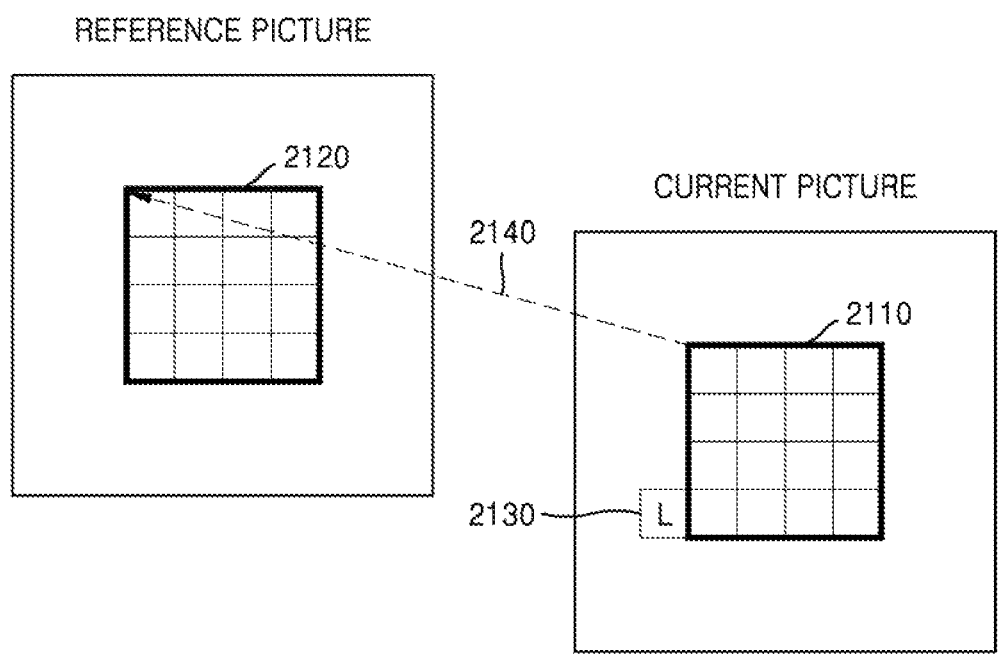
FIG. 21 illustrates a procedure of determining a sub-block unit temporal motion vector candidate.

FIG. 21 illustrates a procedure of determining a sub-block unit temporal motion vector candidate.

Referring to FIG. 21, in order to determine the sub-block unit temporal motion vector candidate (or an alternative temporal motion vector predictor (ATMVP)), it is first determined whether a prediction mode of a left adjacent block 2130 of a current block 2110 of a current picture is an intra prediction mode or an inter prediction mode. When the prediction mode of the left adjacent block 2130 is the inter prediction mode, and a reference picture of the left adjacent block 2130 is the same as a collocated picture of the current block 2110, a temporal motion vector 2140 is determined as a motion vector of the left adjacent block 2130. That is, when the left adjacent block is in the inter prediction mode and has a same reference index as the collocated picture of the current block, the temporal motion vector 2140 is determined as the motion vector of the left adjacent block 2130. Then, it is determined whether a motion vector exists at a center of a reference block 2120 in a reference picture (or a collocated picture) of the left adjacent block 2130, the reference block 2120 corresponding to the current block 2110 and the reference picture being indicated by the temporal motion vector 2140. When the corresponding motion vector exists at the center of the reference block 2120, a motion vector of sub-blocks of the reference block 2120, the sub-blocks corresponding to sub-blocks of the current block 2110 which are 16 sub-blocks, may be determined as a sub-block unit temporal motion vector candidate. Afterward, based on the determined sub-block unit temporal motion vector candidate, motion compensation of the current block 2110 may be performed.

Referring back to FIG. 21, when the prediction mode of the left adjacent block 2130 is an intra prediction mode; or even though the prediction mode of the left adjacent block is the inter prediction mode, if the reference picture of the left adjacent block 2130 is not equal to a collocated picture of the current block 2110, the temporal motion vector 2140 is determined as a zero motion vector. When a corresponding motion vector exists at a center of a block indicated by the zero motion vector, a motion vector of sub-blocks of the block indicated by the zero motion vector is determined as a sub-block unit temporal motion vector candidate.

Also, in a case where the left adjacent block is in the inter prediction mode and has a same reference index as the collocated picture of the current block and thus, the temporal motion vector 2140 is determined as the motion vector of the left adjacent block 2130, when the motion vector does not exist at the center of the reference block 2120 in the reference picture (or the collocated picture) of the left adjacent block 2130, the reference block 2120 corresponding to the current block 2110 and the reference picture being indicated by the temporal motion vector 2140, it is determined that the sub-block unit temporal motion vector candidate does not exist.

Also, in a case where the temporal motion vector is determined as the zero motion vector, when the corresponding motion vector does not exist at the center of the block indicated by the zero motion vector, it is determined that the sub-block unit temporal motion vector candidate does not exist.

Also, when the prediction mode of the left adjacent block 2130 is the inter prediction mode, the reference picture of the left adjacent block 2130 is determined to be equal to the collocated picture of the current block 2110, the corresponding motion vector exists at the center of the reference block 2120, and the motion vector of the sub-blocks of the reference block 2120 does not exist, the motion vector corresponding to the center of the reference block 2120 may be used as a default vector to determine a motion vector of the sub-blocks of the current block 2110. That is, the default vector may be determined as a sub-block unit temporal motion vector. Afterward, motion compensation of the current block 2110 may be performed based on the determined sub-block unit temporal motion vector.

According to an embodiment, when the sub-block unit temporal motion vector candidate is available, a temporal motion vector (TMVP) of the HEVC according to the related art may be optionally used. In detail, a TMVP candidate may not be used at all, or may not be used in a level of a slice, a tile, a largest coding unit, or a coding unit, according to a flag.

With respect to the sub-block unit temporal motion vector candidate, sub-blocks have different motion vectors such that it is required to separately perform motion compensation on each of the sub-blocks. Accordingly, in a worst case, a memory band may be defined as a motion compensation band of a minimum sub-block size.

To solve this problem, according to an embodiment, when the sub-block unit temporal motion vector candidate is used, a height of a reference area of a current block may be restricted to be A times less than a height of the current block, and a width of the reference area may be restricted to be B times less than a width of the current block. When one of sub-blocks of the current block is outside the reference area, a pixel value outside the reference area may be padded with a pixel value at a boundary of the reference area or may be set as a constant value.

According to another embodiment, when the sub-block unit temporal motion vector candidate is used, in order to prevent a range of a motion vector of a sub-block of the current block from accessing a reference area greater than a particular range, the range of the motion vector of the sub-block may be restricted to be within a particular reference area. To do so, the range of the motion vector may be defined to be a rectangular range around a representative motion vector of the current block, and a motion vector outside the defined range may be clipped according to the defined range.

According to another embodiment, when the sub-block unit temporal motion vector candidate is used, in order to prevent a range of a motion vector of a sub-block of the current block from accessing a reference area greater than a particular range, in a case where coordinates of the motion vector of the sub-block are coordinates outside the reference area, the coordinates of the motion vector of the sub-block may be clipped to be in the reference area.

According to another embodiment, when the sub-block unit temporal motion vector candidate is used, the range of the motion vector of the sub-block may be restricted by simultaneously restricting a range of a reference area according to a height or a width of the current block and clipping a motion vector, which is outside the reference area, to be in the reference area.

According to another embodiment, when the sub-block unit temporal motion vector candidate is used, a range of a reference area may be restricted according to a height or a width of the current block, and simultaneously, when coordinates of the motion vector of the sub-block are coordinates outside the reference area, the coordinates of the motion vector of the sub-block may be clipped to be in the reference area.

Also, not only in the sub-block unit temporal motion vector candidate but also in various sub-block merge modes including an affine mode, spatial-temporal motion vector prediction (STMVP), and the like, in a worst case, a memory bandwidth may be defined by a smallest sub-block. Therefore, all sub-block merge modes may be restricted to have a same sub-block size. Accordingly, a design may be uniform, and in a worst case, it is aimed to prevent that a memory bandwidth is to be determined by one sub-block mode. Alternatively, it may be restricted that all sub-block modes have a same sub-block area.

Also, various sub-block modes may exist, and each of the sub-block modes may have a unique sub-block size. For example, a 4×4 block may be used in the affine mode whereas an ATMVP may be restricted as an 8×8 sub-block. Size restrictions of a coding unit may be merged by using a sub-block mode based on sub-block sizes that respectively correspond to the sub-block modes. For example, when a minimum sub-block size of the sub-block mode is M×N, it may be restricted that all coding units whose size is A×B may use the sub-block mode when A>=M and B>=N. Alternatively, when a minimum sub-block size of the sub-block mode is M×N, it may be restricted that all coding units whose size is A×B may use the sub-block mode when A>=M or B>=N. Alternatively, when a minimum sub-block size of the sub-block mode is M×N, it may be restricted that all coding units whose size is A×B may use the sub-block mode when A>M and B>N. Alternatively, when a minimum sub-block size of the sub-block mode is M×N, it may be restricted that all coding units whose size is A×B may use the sub-block mode when A>M or B>N. Alternatively, when a minimum sub-block size of the sub-block mode is M×N, it may be restricted that all coding units whose size is A×B may use the sub-block mode when A*B>M*N. Alternatively, when a minimum sub-block size of the sub-block mode is M×N, it may be restricted that all coding units whose size is A×B may use the sub-block mode when A*B>=M*N.

Figure 22:
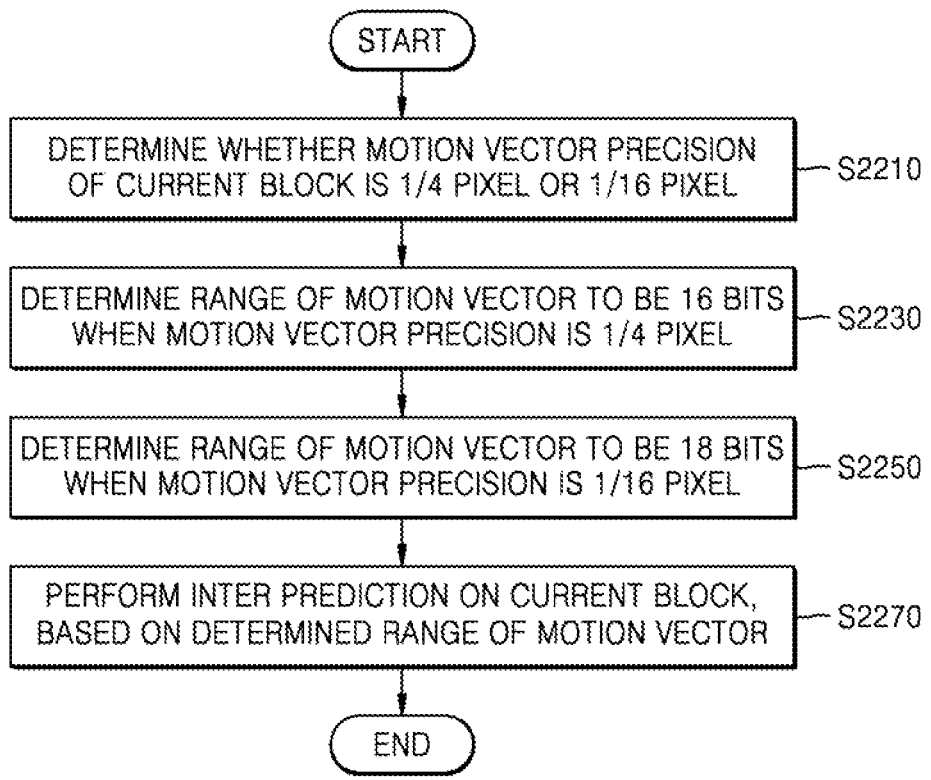
FIG. 22 is a flowchart illustrating a video encoding method according to another embodiment.

FIG. 22 is a flowchart illustrating a video encoding method according to another embodiment.

The video encoding apparatus 1700 of FIG. 17 may perform operations according to the video encoding method of FIG. 22.

The video encoding apparatus 1700 may include the memory 1710, and the at least one processor 1720 connected to the memory 1710. The operations of the video encoding apparatus 1700 according to an embodiment may be performed by individual processors or by a control of a central processor. Also, the memory 1710 of the video encoding apparatus 1700 may store data received from outside, and data generated by the processor, for example, information of a range of a motion vector, or the like.

The processor 1720 of the video encoding apparatus 1700 may determine whether a motion vector precision of a current block is a ¼ pixel or a ¹⁄₁₆ pixel, may determine a range of a motion vector to be 16 bits when the motion vector precision is a ¼ pixel, may determine the range of the motion vector to be 18 bits when the motion vector precision is a ¹⁄₁₆ pixel, and may perform inter prediction on the current block, based on the determined range of the motion vector.

Referring to FIG. 22, in operation S2210, the video encoding apparatus 1700 may determine whether a motion vector precision of a current block is a ¼ pixel or a ¹⁄₁₆ pixel.

According to an embodiment, a prediction mode of inter prediction with respect to the current block may be determined and prediction mode information of inter prediction with respect to the current block may be generated. The prediction mode of inter prediction with respect to the current block may be determined according to a sum of absolute transformed differences (SATD) or rate-distortion optimization (RDO) calculation and prediction mode information indicating the prediction mode of inter prediction with respect to the current block may be encoded and signaled.

According to an embodiment, whether the motion vector precision of the current block is a ¼ pixel or a ¹⁄₁₆ pixel may be determined based on a prediction mode of the current block.

According to an embodiment, when the prediction mode of the current block is an affine mode, the motion vector precision may be determined as a ¹⁄₁₆ pixel.

According to an embodiment, when the prediction mode of the current block is an affine mode, the motion vector precision of the current block may be determined as a ¹⁄₁₆ pixel and when the prediction mode of the current block is not the affine mode, the motion vector precision of the current block may be determined as a ¼ pixel.

According to an embodiment, when it is determined whether the motion vector precision of the current block is a ¼ pixel or a ¹⁄₁₆ pixel, a flag indicating the motion vector precision may be generated.

According to an embodiment, whether the motion vector precision of the current block is a ¼ pixel or a ¹⁄₁₆ pixel may be determined according to a sum of absolute transformed differences (SATD) or rate-distortion optimization (RDO) calculation, and the flag indicating the motion vector precision may be encoded and signaled.

According to an embodiment, the flag indicating the motion vector precision may be set depending on a resolution of a picture. Also, the flag indicating the motion vector precision may be determined depending on setting of an available tool. In more detail, when affine is available, the flag indicating the motion vector precision may be automatically set such that the motion vector precision is a ¹⁄₁₆ pixel.

According to an embodiment, when the prediction mode of the current block is the affine mode, the flag indicating the motion vector precision may be set to indicate that the motion vector precision is a ¹⁄₁₆ pixel.

According to an embodiment, the flag indicating whether the motion vector precision is a ¼ pixel or a ¹⁄₁₆ pixel may be signaled in a sequence parameter set (SPS), a picture parameter set (PPS), a slice header, a picture, a tile group header, or the like.

In operation S2230, the video encoding apparatus 1700 may determine the range of the motion vector to be 16 bits when the motion vector precision is a ¼ pixel.

In operation S2250, the video encoding apparatus 1700 may determine the range of the motion vector to be 18 bits when the motion vector precision is a ¹⁄₁₆ pixel.

In operation S2270, the video encoding apparatus 1700 may perform inter prediction on the current block, based on the determined range of the motion vector.

Figure 23:
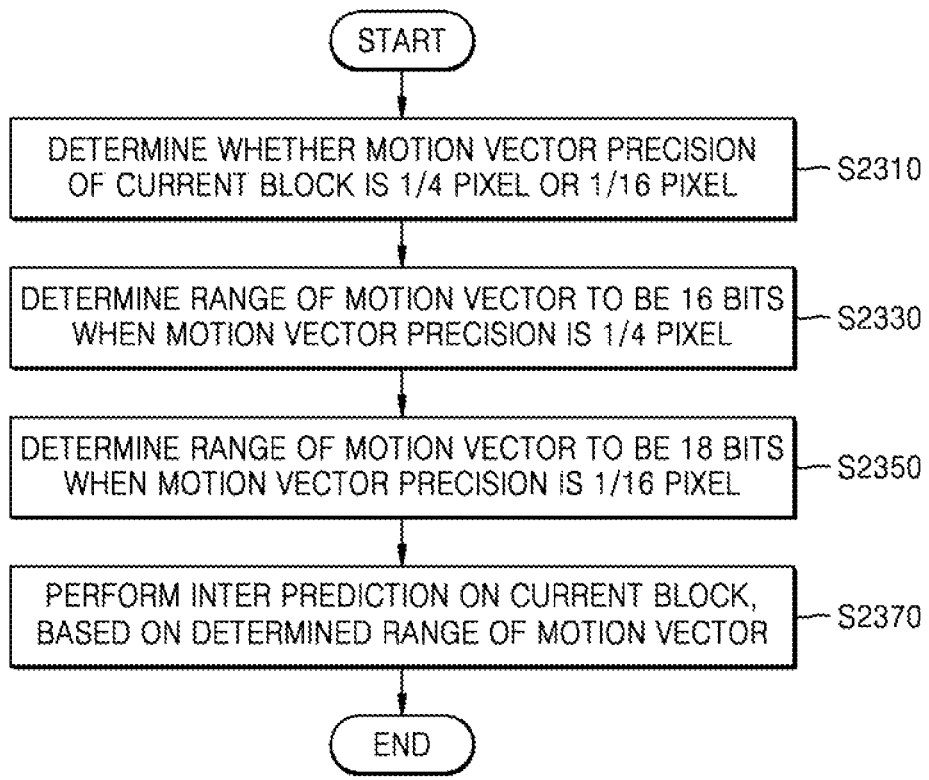
FIG. 23 illustrates a flowchart of a video decoding method according to another embodiment.

FIG. 23 illustrates a flowchart of a video decoding method according to another embodiment.

The video decoding apparatus 1900 of FIG. 19 may perform operations according to the video decoding method of FIG. 23.

The video decoding apparatus 1900 may include the memory 1910, and the at least one processor 1920 connected to the memory 1910. The operations of the video decoding apparatus 1900 according to an embodiment may be performed by individual processors or by a control of a central processor. Also, the memory 1910 of the video decoding apparatus 1900 may store data received from outside, and data generated by the processor, for example, information of a range of a motion vector, or the like.

The processor 1920 of the video decoding apparatus 1900 may determine whether a motion vector precision of a current block is a ¼ pixel or a ¹⁄₁₆ pixel, may determine a range of a motion vector to be 16 bits when the motion vector precision is a ¼ pixel, may determine the range of the motion vector to be 18 bits when the motion vector precision is a ¹⁄₁₆ pixel, and may perform inter prediction on the current block, based on the determined range of the motion vector.

Referring to FIG. 23, in operation S2310, the video decoding apparatus 1900 may determine whether a motion vector precision of a current block is a ¼ pixel or a ¹⁄₁₆ pixel.

According to an embodiment, prediction mode information of inter prediction with respect to a current block may be obtained and a prediction mode of the current block may be determined, based on the prediction mode information.

According to an embodiment, whether the motion vector precision of the current block is a ¼ pixel or a ¹⁄₁₆ pixel may be determined based on a prediction mode of the current block. According to an embodiment, when the prediction mode of the current block is an affine mode, the motion vector precision may be determined as a ¹⁄₁₆ pixel.

According to an embodiment, when the prediction mode of the current block is an affine mode, the motion vector precision of the current block may be determined as a ¹⁄₁₆ pixel and when the prediction mode of the current block is not the affine mode, the motion vector precision of the current block may be determined as a ¼ pixel.

According to an embodiment, whether the motion vector precision of the current block is a ¼ pixel or a ¹⁄₁₆ pixel may be determined according to a flag of the motion vector precision, the flag being obtained from a bitstream.

According to an embodiment, the flag indicating whether the motion vector precision is a ¼ pixel or a ¹⁄₁₆ pixel may be obtained by being signaled in a SPS, a PPS, a slice header, a picture, a tile group header, or the like.

According to an embodiment, the flag indicating the motion vector precision may be set depending on a resolution of a picture. Also, the flag indicating the motion vector precision may be determined depending on setting of an available tool. In more detail, when affine is available, the flag indicating the motion vector precision may be automatically set such that the motion vector precision is a ¹⁄₁₆ pixel.

According to an embodiment, when the prediction mode of the current block is the affine mode, the flag of the motion vector precision may be set to indicate that the motion vector precision is a ¹⁄₁₆ pixel.

In operation S2330, the video decoding apparatus 1900 may determine the range of the motion vector to be 16 bits when the motion vector precision is a ¼ pixel.

In operation S2350, the video decoding apparatus 1900 may determine the range of the motion vector to be 18 bits when the motion vector precision is a ¹⁄₁₆ pixel.

In operation S2370, the video decoding apparatus 1900 may perform inter prediction on the current block, based on the determined range of the motion vector.

Figure 24:
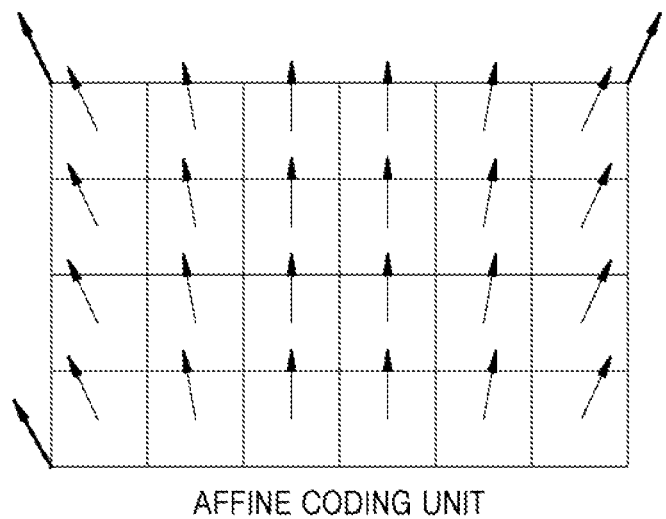
FIG. 24 is a diagram for describing a method of storing a motion vector in an affine mode.
Figure 24:
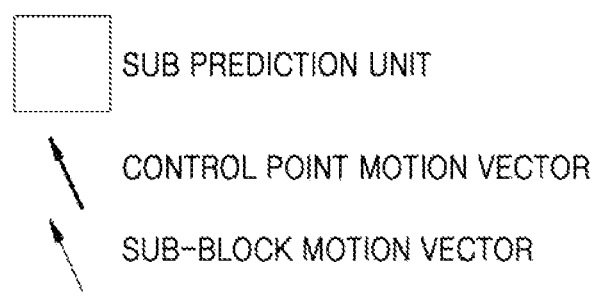

FIG. 24 is a diagram for describing a method of storing a motion vector in an affine mode.

Referring to FIG. 24, a sub-block mode is applied to an affine coding unit. In this regard, two types of a motion vector set exist. First, sub-block motion vectors for respective sub-blocks of an affine coding unit exist, and second, control point motion vectors corresponding to a corner of a coding unit exist. Accordingly, a sub-block located at the corner have both a control point motion vector and a sub-block motion vector of the sub-block itself. In this regard, the term 'control point motion vector' refers to an affine parameter used in an affine mode.

According to an embodiment, sub-block motion vectors of a sub-block located at the corner may be used as a control motion vector, such that a separate control motion vector may not be stored. A control point motion vector may be provided by accessing a motion vector buffer. Therefore, a sub-block motion vector of the sub-block located at the corner may be used to derive a control motion vector of a next block.

According to an embodiment, a control point motion vector of an affine coding unit may be used as a sub-block motion vector. A control point motion vector is not related to a corner but related to a sub-block, such that, although it may be slightly inaccurate, the control point motion vector may be used for motion compensation and de-blocking and may be stored in a motion vector buffer.

Thus, as a motion vector of the sub-block located at the corner, one of the control point motion vector or the sub-block motion vector may be stored in a buffer for all purposes including motion compensation, de-blocking, and the like, such that a buffer amount of a motion vector buffer may be decreased.

According to another embodiment, when a control point motion vector is stored in an adjacent block of a current block, a general motion vector of a current block not in an affine mode may be derived by the control point motion vector stored in the adjacent block. For example, the control point motion vector of the adjacent block may be used to derive a motion vector for a center of the current block. This method may correspond to a motion vector difference (MVD) prediction method. The motion vector generated by using the method may be used as a new candidate in a general merge mode and may be added as a candidate before or after a spatial candidate in a merge candidate list. Also, the motion vector generated by using the method may be used as a new candidate in derivation of a general AMVP.

Figure 25:
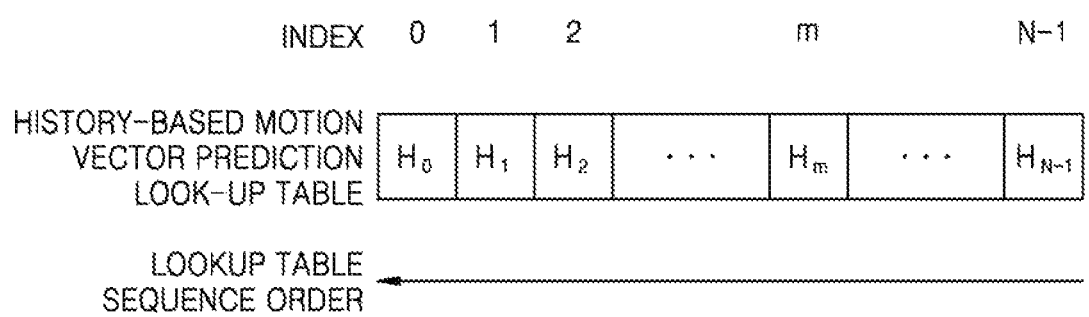
FIG. 25 is a diagram for describing history-based motion vector prediction (HMVP).

FIG. 25 is a diagram for describing history-based motion vector prediction (HMVP).

In the HMVP, a plurality of pieces of motion information of a previously-encoded block or a previously-reconstructed block are stored as HMVP candidates. In more detail, a look-up table storing the HMVP candidates, i.e., a HMVP list, is fetched, and a block is encoded or reconstructed based on the HMVP candidates of the HMVP list.

Referring to FIG. 25, an index of a most-recent stored HMVP candidate is 0 and an index of an earliest-stored HMVP candidate is N−1 from among N HMVP candidates stored in a HMVP look-up table, and according to a lookup table sequence order, from HMVP whose index is N−1 to HMVP whose index is 0 are searched.

Also, when the HMVP list is updated and thus a new HMVP candidate is added thereto, motion information of earliest-stored HMVP0 from among candidates stored in the HMVP list may be removed. That is, the HMVP list is updated according to first-in first-out (FIFO) logic.

According to an embodiment, a plurality of pieces of most-recent stored motion information may be repetition of motion information equal to a plurality of pieces motion information stored in the general merge list. In this case, a HMVP look-up table usage scheme may be modified, such that the plurality of pieces of most-recent stored motion information may not be used, and only up to Mth-recent stored motion information may be used.

According to an embodiment, because an AMVP mode has a relatively small number of candidates, the HMVP scheme by which the plurality of pieces of most-recent stored motion information are not used, and only up to Mth-recent stored motion information are used may be applied only to a merge mode.

According to an embodiment, the HMVP scheme by which the plurality of pieces of most-recent stored motion information are not used, and only up to Mth-recent stored motion information are used may be applied to a HMVP list for a smaller block for which a probability that same motion information as a HMVP candidate among general merge candidates is repeated is low and that is defined a predetermined threshold size, a threshold height, a threshold width, or a combination thereof. When the HMVP list for the smaller block is used in prediction with respect to the smaller block defined according to a predetermined scheme, only up to Mth-recent stored motion information may be used.

According to another embodiment, the HMVP scheme may be applied to HMVP candidates with respect to blocks for which a previously-decoded block is not an adjacent block. In more detail, when a block decoded prior to a current block is not an adjacent block, most-recent stored motion information is not the adjacent block of the current block, such that a HMVP list may be changelessly used. That is, all motion information stored in the HMVP list may be scanned, and a result of the scanning may be used in prediction of the current block.

A position of a HMVP candidate in a merge candidate list may be after a spatial candidate and a temporal candidate. The position of the HMVP candidate in the merge candidate list may vary based on the number of available adjacent blocks and availability of a temporal candidate.

According to an embodiment, the position of the HMVP candidate in the merge candidate list may be fixed. For example, the HMVP candidate may always have $4^{th}$ priority. Also, HMVP candidates may be removed by pruning the HMVP candidates with respect to general merge candidates.

According to an embodiment, when the HMVP candidate is signaled, a decoder may directly access motion information without configuration of a whole merge candidate list.

According to an embodiment, after a flag for a merge mode is signaled, a HMVP candidate list may also be signaled as a separate list.

As HMVP described above, new candidates different from a general merge mode are introduced. In addition to the HMVP, for example, a merge mode with motion vector difference (MMVD), a merge offset, and the like may be available. When a candidate is added to a marge candidate list, the candidate may be pruned with respect to candidates of different modes such as the MMVD, a merge offset mode, or the like, or other candidates derived based on the marge candidate list.

"MMVD" refers to a scheme of selecting a base candidate and adding motion vector offsets in horizontal and vertical directions to the base candidate. Therefore, when base candidates have a same x-component or y-component, most of generated motion vector offsets may be similar to each other. In order to prevent the aforementioned case, base candidates of the MMVD may be pruned. In more detail, a new base vector candidate is subtracted from a pre-added base vector candidate, and when a difference between x-components or a difference between y-components of motion vectors is 0, a new base vector may not be used as a base vector candidate. As another example, a threshold value may be set, such that, when an absolute difference between the x-components or an absolute difference between the y-components of the motion vectors is equal to or smaller than the threshold value, the new base vector may not be used as a base vector candidate. As another example, when a difference between the x-components or a difference between the y-components of the motion vectors is 0, and the other component is equal to one of offset values of the MMVD, the new base vector may not be used as a base vector candidate.

Figure 26:
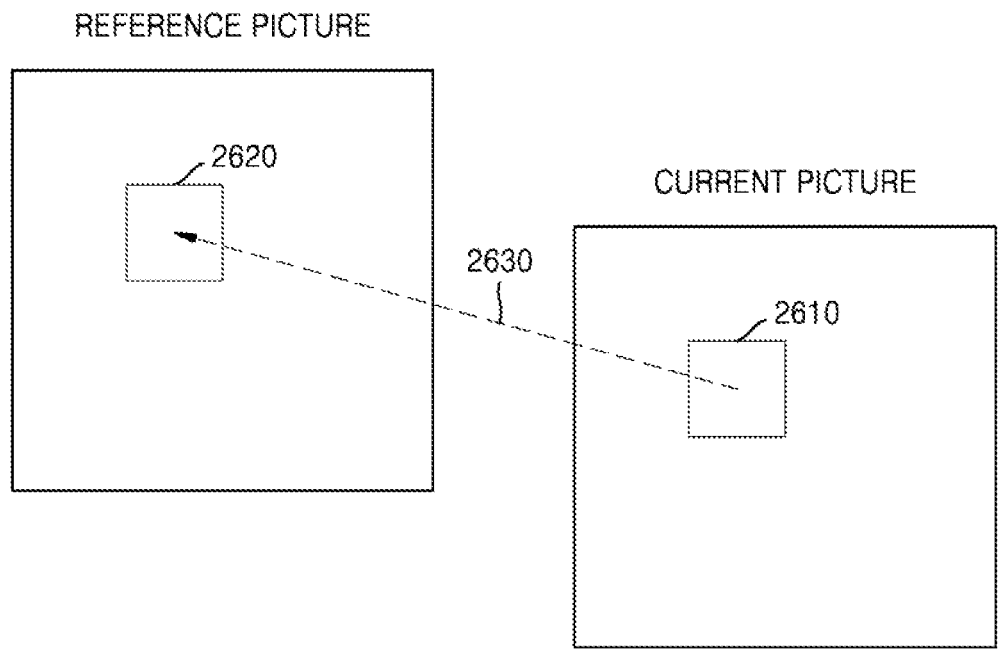
FIG. 26 is a diagram for describing a normalized motion vector.

FIG. 26 is a diagram for describing a normalized motion vector.

Referring to FIG. 26, a reference block 2620 included in a reference picture is determined according to a motion vector 2630 indicated by a current block 2610 included in a current picture. In this regard, it is assumed that a size of the motion vector 2630 is M, and a distance between the current picture and the reference picture is N picture order count (poc). A normalized motion vector having a size of M/N may be obtained by dividing a size of the motion vector by N poc that is a distance between pictures. In this manner, a temporal motion vector may be stored in a normalized form without exception. That is, the temporal motion vector may be scaled, provided that a reference frame is distant by N poc in a predetermined direction. Accordingly, because the temporal motion vector has been already normalized when the temporal motion vector is derived, division may not be required in a scaling process, and only multiplication or a shift operation is required to derive the temporal motion vector. This scheme may be extended to storing of a motion vector of a current frame, such that all motion buffers may include a normalized motion vector.

Figure 27:
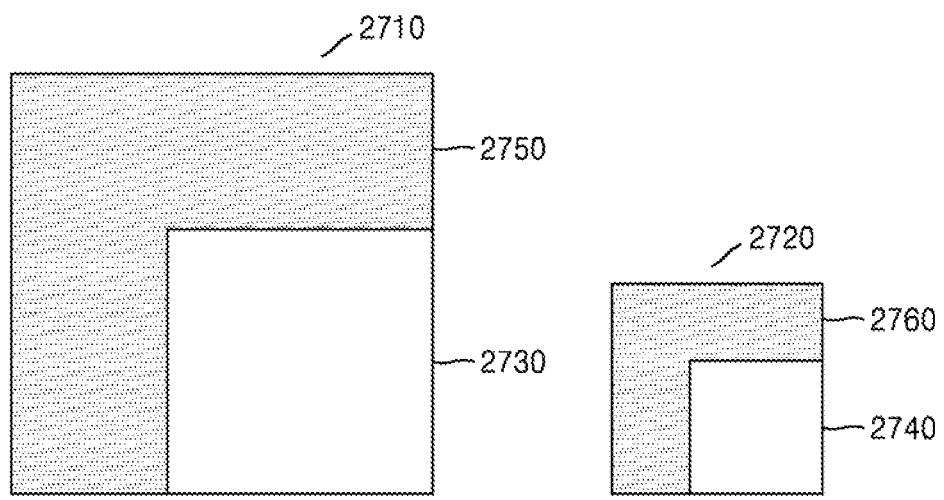
FIG. 27 is a diagram for describing a method of determining a cross component linear model for determining a chroma sample of a chroma block.

FIG. 27 is a diagram for describing a method of determining a cross component linear model for determining a chroma sample of a chroma block.

FIG. 27 illustrates a current chroma block 2740 of a chroma component 2720 and a reconstructed adjacent chroma block 2760 located adjacent to the current chroma block 2740, which respectively correspond to a current luma block 2730 of a luma component 2710 and a reconstructed adjacent luma block 2750 located adjacent to the current luma block 2730.

Referring to FIG. 27, the cross component linear model determines a linear model by using a sample value of the reconstructed adjacent luma block and a sample value of the reconstructed adjacent chroma block, and obtains a sample value of the current chroma block by applying a reconstructed luma sample value of the current luma block to the determined linear model.

Figure 28:
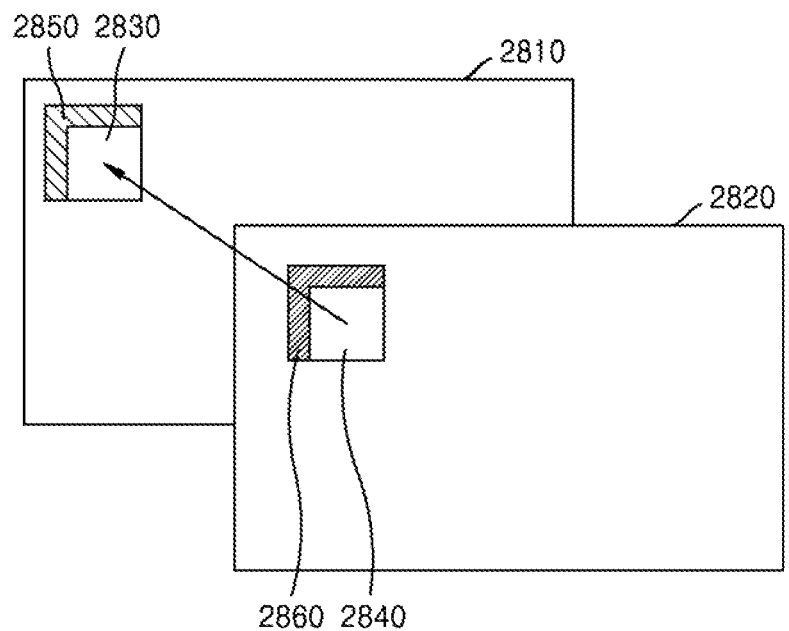
FIG. 28 is a diagram for describing a method of determining a linear model for local luminance compensation.

FIG. 28 is a diagram for describing a method of determining a linear model for local luminance compensation.

The linear model for local luminance compensation determines a linear model by using reconstructed samples 2860 of an adjacent block neighboring a current block 2840 of a current frame 2820 and reference samples 2850 of an adjacent reference block neighboring a reference block 2830 of a reference frame 2810 indicated by motion information of the current block 2840, and applies a predicted sample value of the current block to the determined linear model so as to obtain a sample value to which local luminance compensation of the current block is applied.

Referring to FIGS. 27 and 82, when deriving a linear model in order to generate both the linear model to be applied to local luminance compensation and the cross component linear model, two methods may be harmonized by using a same linear regression function and a same normalization parameter.

The cross component linear model of FIG. 27 is an example of an intra coding tool. The intra coding tool may be inefficient when it is used in an inter slice. In more detail, all intra coding tools used in inter slices (a P slice and a B slice) may be inefficient in an inter slice for an intra block. Accordingly, an intra tool may not be completely allowed for each inter slice, or may be inactivated in a level of a slice, a tile, a largest coding unit, or a coding unit, according to a flag. Examples of the intra tool that may be inactivated may include luma chroma partition for separately splitting luma and chroma, multi-line intra prediction, and the like.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the afore-described embodiments of the disclosure can be written as a program executable on a computer, and can be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. A video decoding method comprising:
    obtaining a first bin of a sub-block merge index indicating a candidate motion vector of a sub-block merge mode, the first bin being arithmetic encoded using a context model;
    obtaining a second bin of the sub-block merge index, based on a first value obtained by arithmetic-decoding the first bin by using the context model;
    obtaining a second value by arithmetic-decoding the second bin in a bypass mode; and
    performing prediction on a current block in the sub-block merge mode, based on the first value and the second value,
    wherein the first value is determined based on a probability that a sub-block unit temporal motion vector candidate will be selected,
    wherein the sub-block merge mode is a mode having a motion vector for a sub-block of the current block;
    wherein an availability of the sub-block unit temporal motion vector candidate is determined based on whether a size of the current block is equal to or greater than 8×8.

2. A video encoding method comprising:
    generating a symbol indicating a sub-block merge index indicating a candidate motion vector of a sub-block merge mode, by performing prediction on a current block in the sub-block merge mode;
    performing arithmetic encoding on a first bin of the symbol by using a context model;
    performing bypass mode arithmetic encoding on a second bin of the symbol, based on the first bin of the symbol; and generating a bitstream, based on a result of the arithmetic encoding using the context model and a result of the bypass mode arithmetic encoding, wherein the first bin of the symbol is determined based on a probability that a sub-block unit temporal motion vector candidate will be selected, wherein the sub-block merge mode is a mode having a motion vector for a sub-block of the current block;

wherein an availability of the sub-block unit temporal motion vector candidate is determined based on whether a size of the current block is equal to or greater than 8×8.

3. A non-transitory computer-readable medium for recording a bitstream, the bitstream comprising:

a result of an arithmetic encoding using an context model and a result of a bypass mode arithmetic encoding, wherein, the bitstream is obtained by:

generating a symbol indicating a sub-block merge index indicating a candidate motion vector of a sub-block merge mode, by performing prediction on a current block in the sub-block merge mode;

performing the arithmetic encoding on a first bin of the symbol by using the context model;

performing the bypass mode arithmetic encoding on a second bin of the symbol, based on the first bin of the symbol; and generating the bitstream, based on the result of the arithmetic encoding using the context model and the result of the bypass mode arithmetic encoding, wherein the first bin of the symbol is determined based on a probability that a sub-block unit temporal motion vector candidate will be selected, wherein the sub-block merge mode is a mode having a motion vector for a sub-block of the current block, and wherein an availability of the sub-block unit temporal motion vector candidate is determined based on whether a size of the current block is equal to or greater than 8×8.

* * * * *